(12) United States Patent
Ichinose et al.

(10) Patent No.: US 7,463,818 B2
(45) Date of Patent: Dec. 9, 2008

(54) INFORMATION RECORDING/PLAYBACK PROCESSOR, METHOD, AND COMPUTER READABLE MEDIUM STORING COMPUTER EXECUTABLE INSTRUCTIONS, WITH ADDITIONAL DATA RECORDED WITH CONTENT DATA

(75) Inventors: Tsutomu Ichinose, Tochigi (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 790 days.

(21) Appl. No.: 11/002,830

(22) Filed: Dec. 2, 2004

(65) Prior Publication Data

US 2005/0123271 A1    Jun. 9, 2005

(30) Foreign Application Priority Data

Dec. 4, 2003    (JP) ............................ P2003-406196

(51) Int. Cl.
*H04N 5/913* (2006.01)
(52) U.S. Cl. .................................. 386/94; 386/E5.004
(58) Field of Classification Search .................. 386/94, 386/95, 125, E5.02, E5.004; 380/287
See application file for complete search history.

(56) References Cited

U.S. PATENT DOCUMENTS

2004/0161113 A1 *    8/2004    Coene et al. ................ 380/287

* cited by examiner

*Primary Examiner*—David E Harvey
(74) *Attorney, Agent, or Firm*—Oblon, Spivak, McClelland, Maier & Neustadt, P.C.

(57) ABSTRACT

In an information recording processor, component bits of additional data to be recorded on an information recording medium are stored in specific user control data. Pointer information representing row and column numbers used as identification information of the user control data is set as the values of DC control bits in a user-control-data-pointer-information-set recording frame selected from recording data. In an information playback processor, from the DC control bits in the recording frame, the row and column numbers of the user control data are acquired. The user control data is acquired and the additional data is acquired.

20 Claims, 18 Drawing Sheets

FIG. 4

| INPUT DATA BITS | MODULATED DATA BITS |
|---|---|
| 00000000 | 010100100100 |
| 00001000 | 000100100100 |
| 000000 | 010100000 |
| 000001 | 010100100 |
| 000010 | 000100000 |
| 000011 | 000100100 |
| 0001 | 000100 |
| 0010 | 010000 |
| 0011 | 010100 |
| 01 | 010 |
| 10 | 001 |
| 11 | 000   PRECEDENT MODULATED BIT = xx1<br>101   PRECEDENT MODULATED BIT = xx0 |

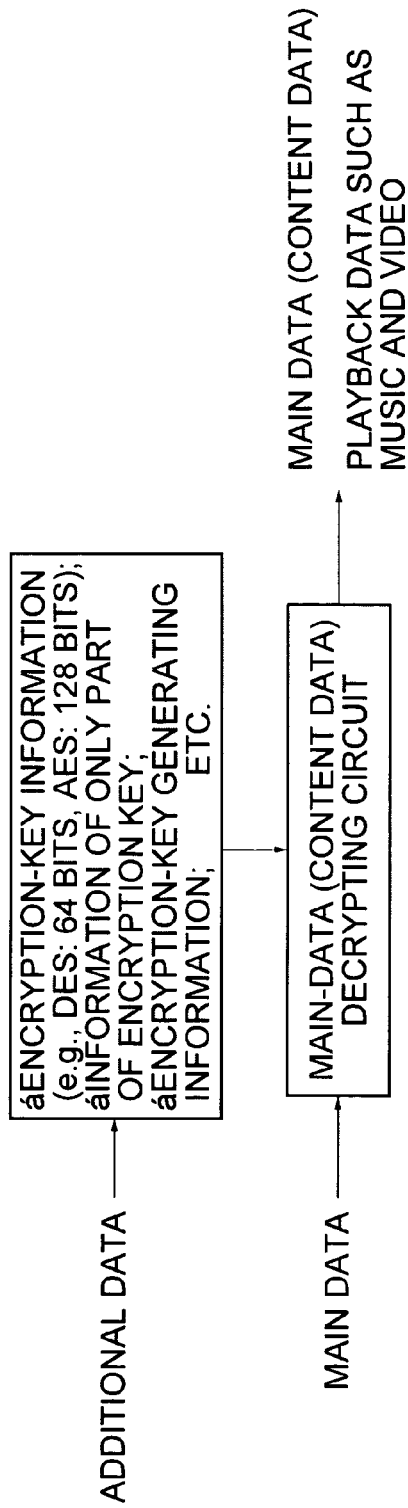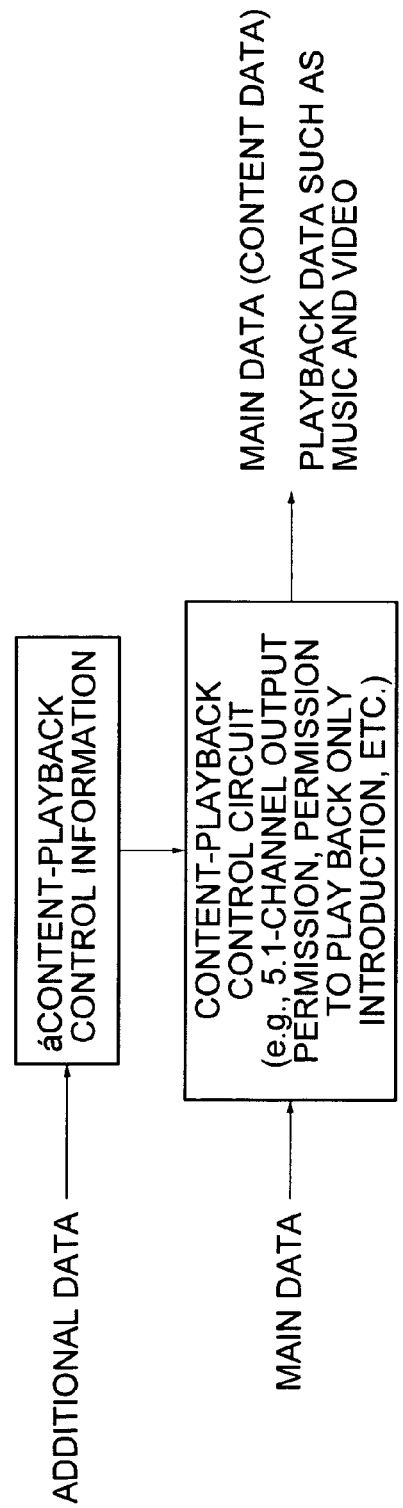

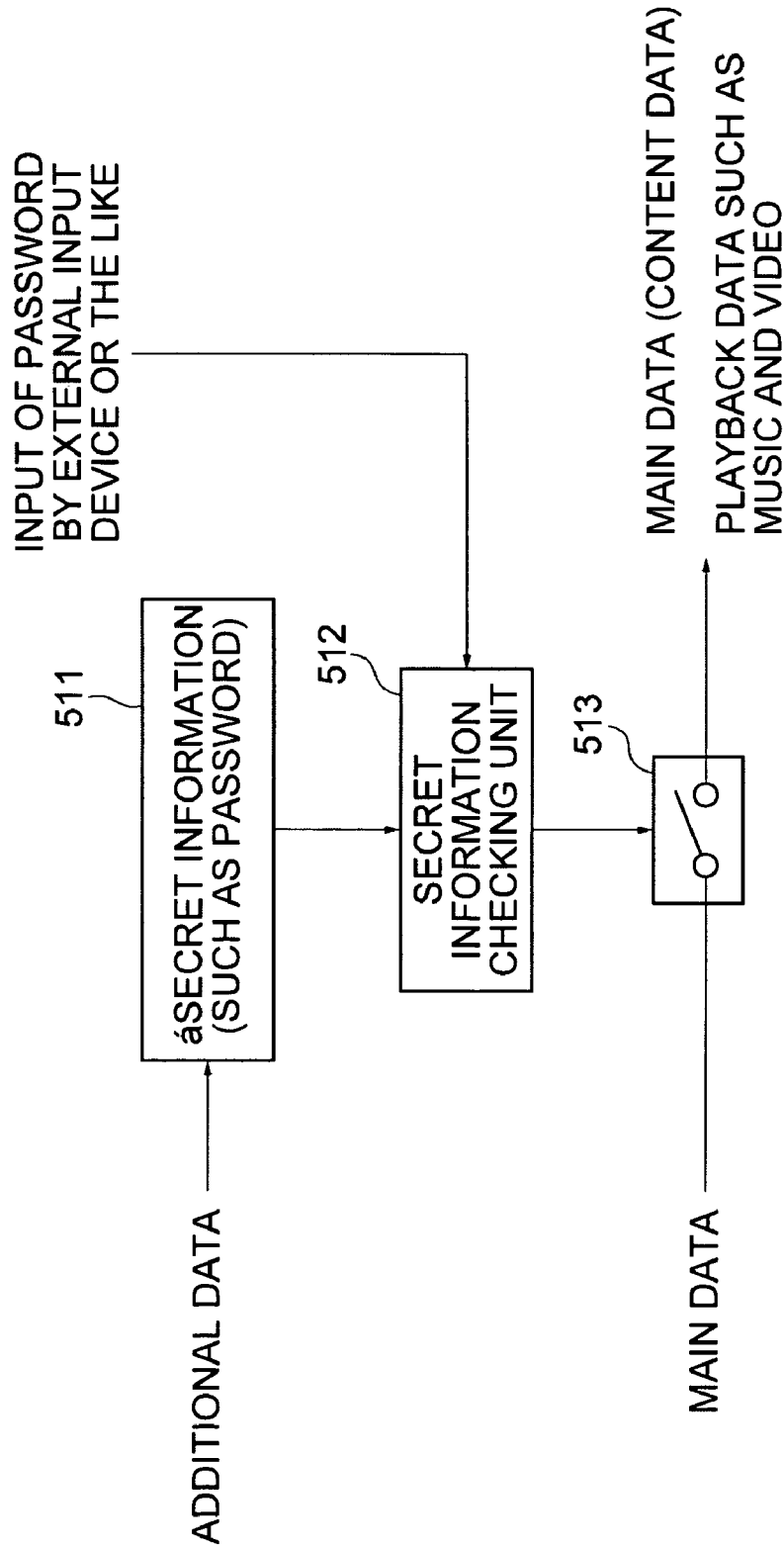

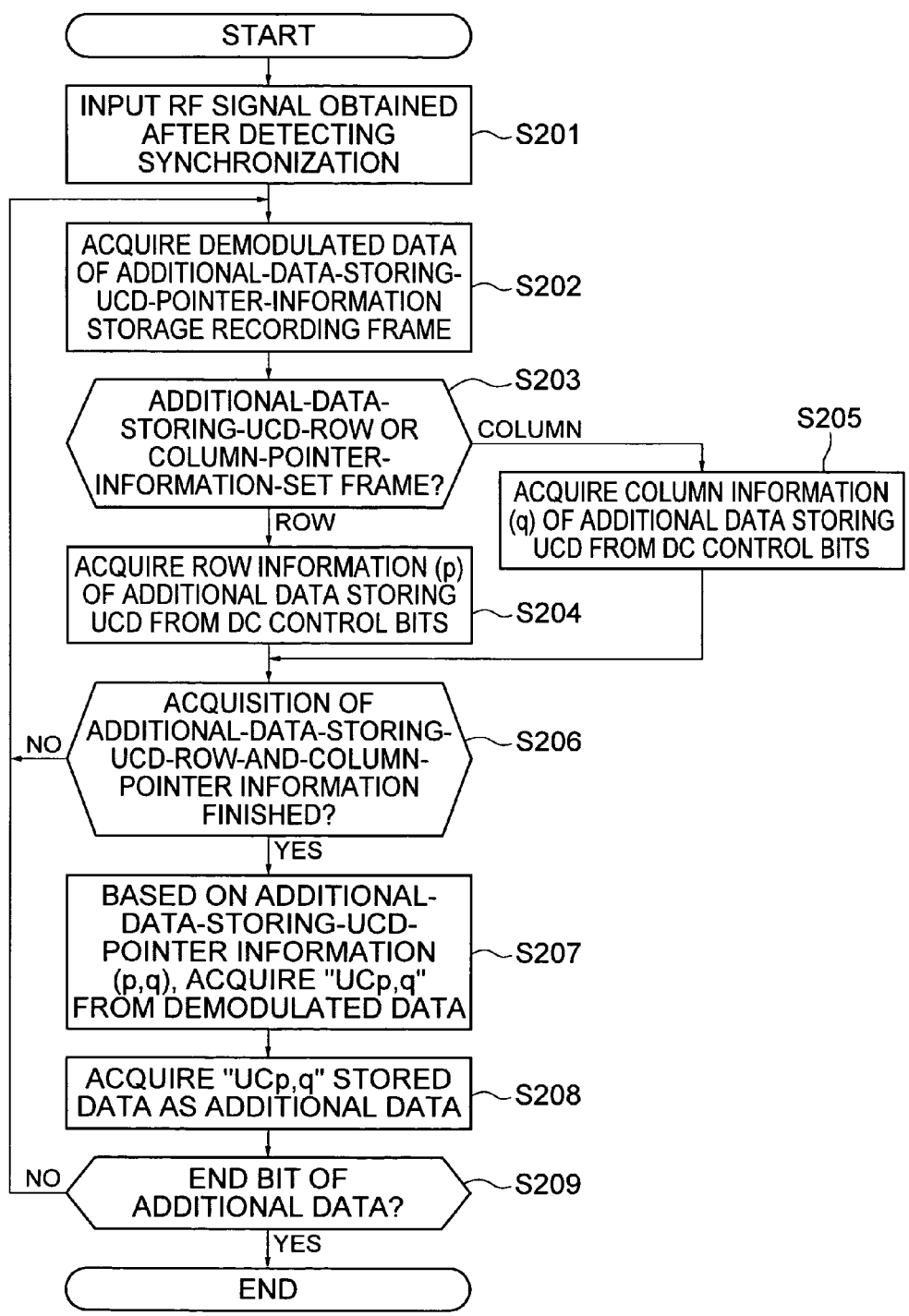

INFORMATION RECORDING/PLAYBACK PROCESSOR, METHOD, AND COMPUTER READABLE MEDIUM STORING COMPUTER EXECUTABLE INSTRUCTIONS, WITH ADDITIONAL DATA RECORDED WITH CONTENT DATA

BACKGROUND OF THE INVENTION

1. Field of the Invention

The present invention relates to information recording processors, information playback processors, methods therefor, and information recording media and computer programs used therewith. In particular, the present invention relates to an information recording processor, an information playback processor, and a method therefor in which, in a configuration capable of recording additional data, such as key information for use in decrypting content, content-playback control information, and copy-control information, on an information recording medium containing content, such as image data and music data, and reading the additional data, specific user control data included in recording data is set as additional-data storing user control data, and DC control bits set in a specific recording frame included in the recording data are set as pointer information representing the position of the additional-data storing user control data, whereby embedding of additional data that is difficult to analyze is realized. In addition, the present invention relates to a recording medium and computer program used with the information recording processor, the information playback processor, and the method therefor.

2. Description of the Related Art

When data, such as music data and image data, is recorded in digital form on a recording medium, recording processing is performed in accordance with a predetermined recording format. For example, error-detecting/correcting codes are added to original data to be recorded, and the data is recorded in a form in which it is coded to have a format adapted for specific data recording/playback processing.

Regarding an information recording medium enabling high-density information recording, recently, an information recording medium based on a system using a blue laser to perform information recording and playback has been developed. In information recording using the blue laser, processing that converts two-bit data into three-bit data is basically performed.

Types of content to be recorded on the above information recording medium include, for example, movie data and music data. In general, rights of distribution, etc., of many types of content, such as music data and image data, are owned by content creators or sellers. Therefore, in a common form for distributing the types of content, certain limitations in the use of the content are set, that is, by allowing only registered users to use the content, unauthorized reproduction, etc., are prevented.

On a mass-storage recording medium, such as a recording medium using a blue-laser recording system capable of mass-storage recording, for example, a data capacity corresponding to one to several movies can be recorded. Since content can be easily recorded as described above in the form of digital information, many problems such as the spreading of unauthorized copies occur, so that reduction in profit of the copyright holder and distributor of the content becomes a large problem.

A system for preventing such unauthorized use of content has been proposed. In this system, content to be recorded on an information recording medium is recorded in encrypted form, and, simultaneously, encryption-key information for use as an encryption key for the encrypted content, information forming partial data of the encryption-key information, encryption-key generating information, such as data (e.g., a seed) required for generating an encryption key, or control information of various types, such as content-playback control information and copy-control information, is recorded as secret information on the information recording medium. In addition, a playback-processing program executed in a playback apparatus of a user reads the secret information, such as a key corresponding to the content to be played back, decrypts the content in accordance with the read secret information, and allows use of the content in accordance with playback-control information.

Regarding an example of the related art which discloses processing using embedding of secret information, for example, Japanese Unexamined Patent Application Publication No. 2003-45128 discloses a technology in which special data is embedded by using margin bits of eight-to-fourteen modulated data. Japanese Unexamined Patent Application Publication No. 2002-367282 discloses a technology in which, in a system using transformation tables for modulating processing, data concerning one transformation table, which is used in modulation, is extracted and additional data is acquired based on the extracted data.

However, if the user or an authorized user of content acquires information representing the position of such an encryption key or control information on the information recording medium, that person can leak or alter the additional data. For example, a problem occurs, that is, information or copy-control information may be altered, or key information may leak out. Leaking of the encryption key or alteration of the control information will break a content-utilization form based on the valid right to use content, so that it is difficult to sufficiently protect the copyright of the content and the right to use the content.

SUMMARY OF THE INVENTION

In view of the above problems, it is an object of the present invention to provide an information recording processor, an information playback processor, and a method therefor in which, in a configuration capable of recording additional data, such as key information for use in decrypting content, content-playback control information, and copy-control information, on an information recording medium containing content, such as image data and music data, and reading the additional data, by setting additional data based on correspondence between bit values of specific user control data included in recorded data and DC control bits set in the recorded data, embedding of additional data that is difficult to analyze is realized, and to provide a recording medium and computer program used with the information recording processor, the information playback processor, and the method therefor.

According to a first aspect of the present invention, an information recording processor is provided which includes a DC-control-bit selecting unit for setting, as the values of DC control bits set in a user-control-data-pointer-information-set recording frame in which pointer information of user control data is set, the recording frame being selected from data to be recorded on an information recording medium, identification information of additional-data-storing user control data having component bits of additional data to be recorded on the information recording medium, and a modulated data generating unit for generating a modulated recording frame used as recording-unit data by executing processing for modulating data to be recorded and DC-control-bit setting processing, the modulated data generating unit selectively executing the DC-control-bit setting processing based on control of a digital sum variation and the DC-control-bit setting processing based on information input from the DC-control-bit selecting unit.

According to a second aspect of the present invention, an information playback processor for executing processing for playing back information recorded on an information recording medium is provided. The information playback processor includes a data demodulating unit for executing demodulating processing on data read from the information recording medium, and an additional data decoding unit for executing processing for performing extraction of a user-control-data-pointer-information-set frame in which pointer information of additional-data-storing user control data including additional data is set, acquisition of the pointer information of the additional-data-storing user control data on the basis of DC-control-bit information set in the extracted user-control-data-pointer-information-set frame, acquisition of the additional-data-storing user control data identified based on the pointer information, and acquisition of additional-data-component-bit information from the acquired user control data.

According to a third aspect of the present invention, an information recording medium is provided which contains user control data identifiable based on pointer information, the user control data including additional data, and recording data based on a recording frame in which pieces of the pointer information are set at DC-control-bit setting positions.

According to a fourth aspect of the present invention, an information recording method is provided which includes a DC-control-bit selecting step of selecting, as the values of DC control bits set in a user-control-data-pointer-information-set recording frame in which pointer information of user control data is set, the recording frame being selected from data to be recorded on an information recording medium, identification information of additional-data-storing user control data having component bits of additional data to be recorded on the information recording medium, and a modulated data generating step in which a modulated recording frame used as recording-unit data is generated by executing processing for modulating data to be recorded and DC-control-bit setting processing, and in which the DC-control-bit setting processing based on control of a digital sum variation and the DC-control-bit setting processing based on selecting information in the DC-control-bit selecting step are selectively executed.

According to a fifth aspect of the present invention, an information playback method for executing processing for playing back information recorded on an information recording medium is provided. The information playback method includes a data demodulating step of executing demodulating processing on data read from the information recording medium, and an additional data decoding step of executing processing for performing extraction of a user-control-data-pointer-information-set frame in which pointer information of additional-data-storing user control data including additional data is set, acquisition of pointer information of the additional-data-storing user control data based on DC-control-bit information set in the extracted user-control-data-pointer-information-set frame, acquisition of the additional-data-storing user control data identified based on the pointer information, and acquisition of additional-data-component bit information from the acquired user control data.

According to a sixth aspect of the present invention, a computer program for executing information recording processing is provided. The computer program includes a DC-control-bit selecting step of selecting, as the values of DC control bits set in a user-control-data-pointer-information-set recording frame in which pointer information of user control data is set, the recording frame being selected from data to be recorded on an information recording medium, identification information of additional-data-storing user control data having component bits of additional data to be recorded on the information recording medium, and a modulated data generating step in which a modulated recording frame used as recording-unit data is generated by executing processing for modulating data to be recorded and DC-control-bit setting processing, and in which the DC-control-bit setting processing based on control of a digital sum variation and the DC-control-bit setting processing based on selecting information in the DC-control-bit selecting step are selectively executed.

According to a seventh aspect of the present invention, a computer program for executing processing for playing back information recorded on an information recording medium is provided. The computer program includes a data demodulating step of executing demodulating processing on data read from the information recording medium, and an additional data decoding step of executing processing for performing extraction of a user-control-data-pointer-information-set frame in which pointer information of user control data including additional data is set, acquisition of the pointer information of the additional-data-storing user control data on the basis of DC-control-bit information set in the extracted user-control-data-pointer-information-set frame, acquisition of the additional-data-storing user control data identified based on the pointer information, and acquisition of additional data component bits from the acquired user control data.

According to the present invention, component bits of additional data to be recorded on an information recording medium are stored in specific user control data, and pointer information which represents row and column numbers used as identification information of the additional-data-storing user control data is set as the values of DC control bits set in an additional-data-storing-user-control-data pointer-information-set frame selected from data to be recorded. In an information playback processor of the present invention, from DC control bits in the additional-data-storing-user-control-data pointer-information-set frames, row and column numbers of the additional-data-storing user control data are extracted, whereby additional data can be acquired. According to the present invention, embedding of additional data that is difficult to analyze is realized. The present invention is applicable to an information recording processor and information playback processor in which content, whose copyright must be protected, is recorded on a recording medium, and in which additional data, such as key information for use in decrypting the content, key-generating information, content-playback control information, or copy-control information, must be embedded in a hardly analyzable form. In addition, the present invention is applicable to an information recording medium used therewith.

Further objects, features and advantages of the present invention will become apparent from the following description of the preferred embodiments with reference to the attached drawings.

BRIEF DESCRIPTION OF THE DRAWINGS

FIG. 4 is an illustration of data in a transformation table for use in modulating processing in the information recording processor shown in FIG. 1;

FIGS. 16A and 16B are block diagrams illustrating applications of additional data in the information playback processor of the present invention; and FIG. 17 is a block diagram illustrating an application of additional data in the information playback processor of the present invention; and FIG. 18 is a flowchart illustrating an additional data recording process of the information playback processor of the present invention.

DESCRIPTION OF THE PREFERRED EMBODIMENTS

An information recording processor, information playback processor, and method therefor according to an embodiment of the present invention, and an information recording medium and computer program used therewith are described below with reference to the accompanying drawings.

At first, the configuration and processing for the information recording processor according to the embodiment of the present invention are described with reference to FIG. 1.

The meaning of the information recording processor described below includes a mastering apparatus that is an apparatus for producing a so-called "master disk", and includes an apparatus having an information recording medium drive, which is usable by a general user, such as a DVD (digital versatile disk) recording/playback apparatus or a personal computer. In other words, the meaning of the information recording processor includes an information processing apparatus capable of recording data not only to a master disk, but also to various information recording media of recordable and rewritable types.

Figure 1:
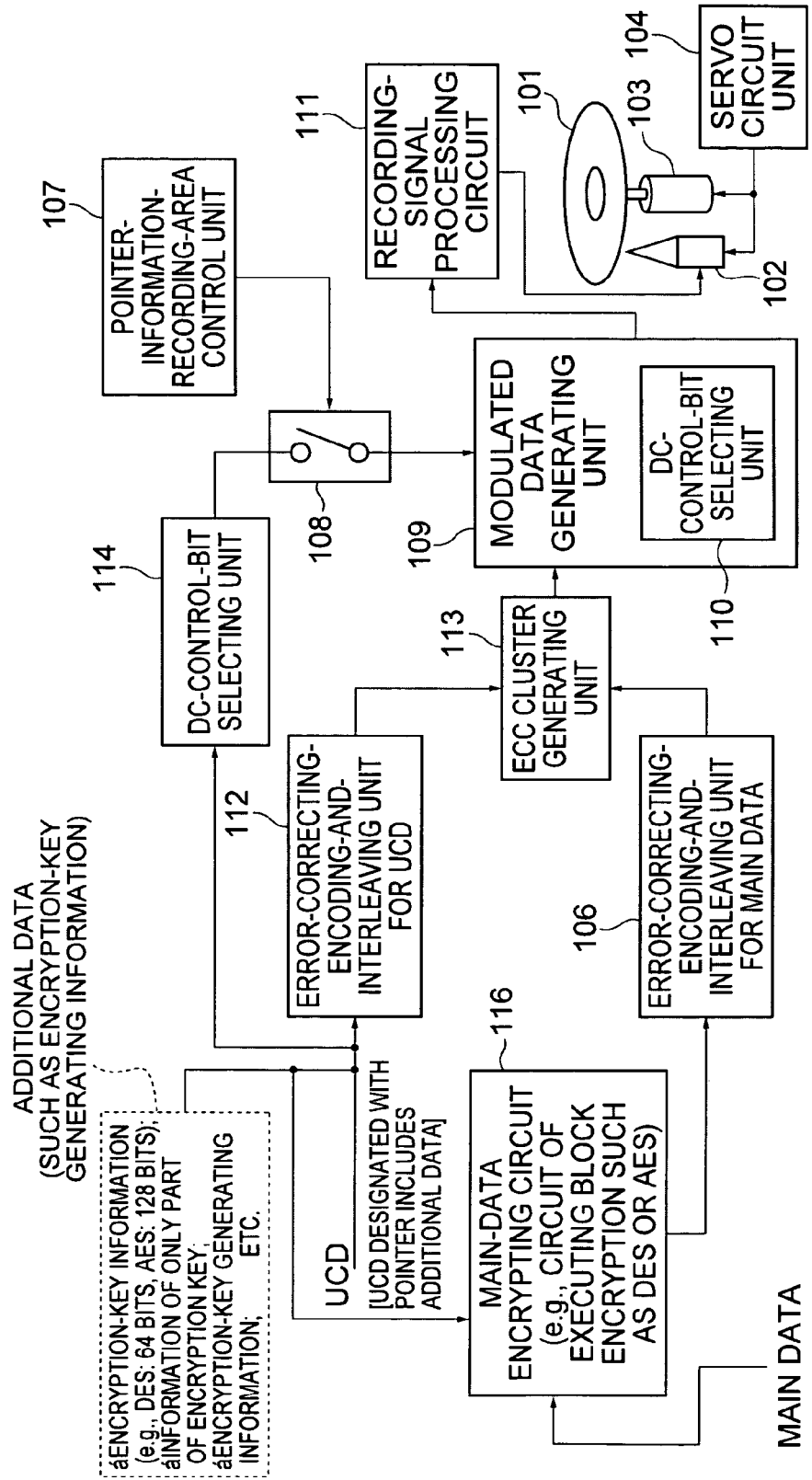
FIG. 1 is a block diagram showing an information recording processor according to an embodiment of the present invention.

As shown in FIG. 1, the information recording processor includes an information recording medium 101 on which data can be recorded, a pickup 102 for outputting a data recording signal to the information recording medium 101, a spindle motor 103 for driving the information recording medium 101, a servo circuit 104 for controlling the pickup 102 and the spindle motor 103, an error-correcting-encoding-and-interleaving unit 106 for main data, a pointer-information-recording-area control unit 107, a switch 108, a modulated data generating unit 109, a DC-control-bit setting unit 110, a recording-signal processing circuit 111, an error-correcting-encoding-and-interleaving unit 112 for user control data, an ECC cluster generating unit 113, a DC-control-bit selecting unit 114, and a main-data encrypting circuit 116.

Recording data to be recorded on the information recording medium 101 includes main data formed by substantial data of data (such as content) to be played back, user control data (UCD) including various types of control data such as playback-control information, and additional data. The additional data is encryption-key information for use as an encryption key for encrypted content, information forming part of the encryption-key information, encryption-key generating information such as the data (e.g., a seed) required for generating an encryption key, or secret information such as a password, control information such as content playback control information or copy-control information. The additional data is stored selected specific user control data. User control data storing additional data is hereinafter referred to as "additional-data storing user control data".

User control data is divided into data units, each unit having eight bits. Each 8-bit user-control-data unit can be identified based on row information (p) and column information (q). The additional-data storing user control data is a specific user-control-data unit selected from the 8-bit user-control-data units. A detailed configuration of the user control data is described later.

The DC-control-bit selecting unit 114 executes selecting the values of DC control bits which are set in a pointer-information storage recording frame which stores, as a pointer, identification information of additional-data storing user control data. Specifically, a row pointer representing row information (p) of the additional-data storing user control data, which is user control data storing additional data, or a column pointer representing column information (q) is set as the values of DC control bits.

A playback processor that acquires additional data acquires row information (p) and column information (q) of additional-data storing user control data on the basis of DC-control-bit information in a recording frame storing pointer information of additional-data storing user control data. The playback processor identifies the user control data storing additional data, and acquires additional data, such as encryption-key information, from the additional-data storing user control data. Details of this processing are described later.

Content data to be recorded on the information recording medium 101 is, for example, encrypted content data. The main data is encrypted by using an encryption key in the main-data encrypting circuit 116. The main-data encrypting circuit 116 generates encryption main data by receiving, for example, a 64-bit DES (data encryption standard) encryption key, 128-bit AES (advanced encryption standard) encryption key, information of a component of the encryption key, or a seed which is encryption-key generating information, and executing block-encryption processing, such as DES algorithm or AES algorithm, on the main data, such as content data, by using an encryption key generated based on the input information.

The encrypted main data is input to the error-correcting-encoding-and-interleaving unit 106. The error-correcting-encoding-and-interleaving unit 106 generates error-correcting codes and performs coding of the input data, and also performs interleaving processing.

The error-correcting-encoding-and-interleaving unit 112 generates error-correcting codes and performs coding of also on the user control data including the various types of control data, such as playback-control information, and performs interleaving processing.

The ECC cluster generating unit 113 generates ECC clusters based on the interleaving-processed main data and user control data, and the modulated data generating unit 109 receives the ECC clusters and executes modulating on the received ECC clusters. The modulated data generating unit 109 executes modulation based on the RLL (run length limited) (1, 7) modulation system in which modulation of two-bit data into three-bit data is basically performed.

In the modulation based on the (1, 7) RLL modulation system, data transformation is performed to produce modulated data in accordance with run-length limitation of (1, 7) RLL in which the number of consecutive 0's is a minimum of one and a maximum of seven. In this transformation processing, a transformation table is used. A specific example of using the transformation table is described later.

Based on modulated data based on the (1, 7) RLL system, a recording unit in which a synchronizing signal is set, which is called a "recording frame", is generated and is recorded on the information recording medium 101 through the recording-signal processing circuit 111.

The modulating processing is performed after the DC-control-bit setting unit 110 selects "0" or "1" as each DC control bit for insertion so that the absolute value of a digital sum variation (DSV) decreases at regular intervals of the input main data.

The digital sum variation is a DC balance index of an NRZI (nonreturn to zero change on one) transformation signal generated as a recording signal for the information recording medium 101. Specifically, by totaling bits of a recording bit series (NRZI transformation signal), with each bit "0" as "−1", and each bit "1" as "+1", the total is obtained and is used as a digital sum variation. After the DC control bit "0" or "1" is selectively inserted so that the divergence of the digital sum variation from "0" is minimum, the modulating processing is performed. Details of the NRZI transformation processing are described later.

In the present invention, in this DC control bit setting, for a selected specific recording frame, that is, a recording frame in which pointer information of additional-data storing user control data is set, bit values selected by the DC-control-bit selecting unit 114 are set as DC control bits without using DC-control-bit setting in accordance with the above rule.

In other words, a row pointer or column pointer of the additional-data storing user control data, which is user control data storing additional data, is set as the values of the DC control bits.

The DC-control-bit information selected by the DC-control-bit selecting unit 114, that is, DC-control-bit values, which serve as bit values forming the row pointer or column pointer of the additional-data storing user control data, are output from the DC-control-bit selecting unit 114 to the modulated data generating unit 109 through a switch 108 controlled by the pointer-information-recording-area control unit 107. In the modulated data generating unit 109, DC control bits set in the frame in which pointer information of additional-data storing user control data is set are set to have values corresponding to the pointer information received from the DC-control-bit selecting unit 114. Details of this processing are described later.

Details of ECC-cluster setting processing and modulated-data generating processing, which are based on main data and user control data, are described below with reference to FIGS. 2 and 3. The ECC-cluster setting processing and the modulated-data generating processing are executed by the error-correcting-encoding-and-interleaving unit 106, the error-correcting-encoding-and-interleaving unit 112, the ECC cluster generating unit 113, and the modulated data generating unit 109, which are shown in FIG. 1.

Figure 2:
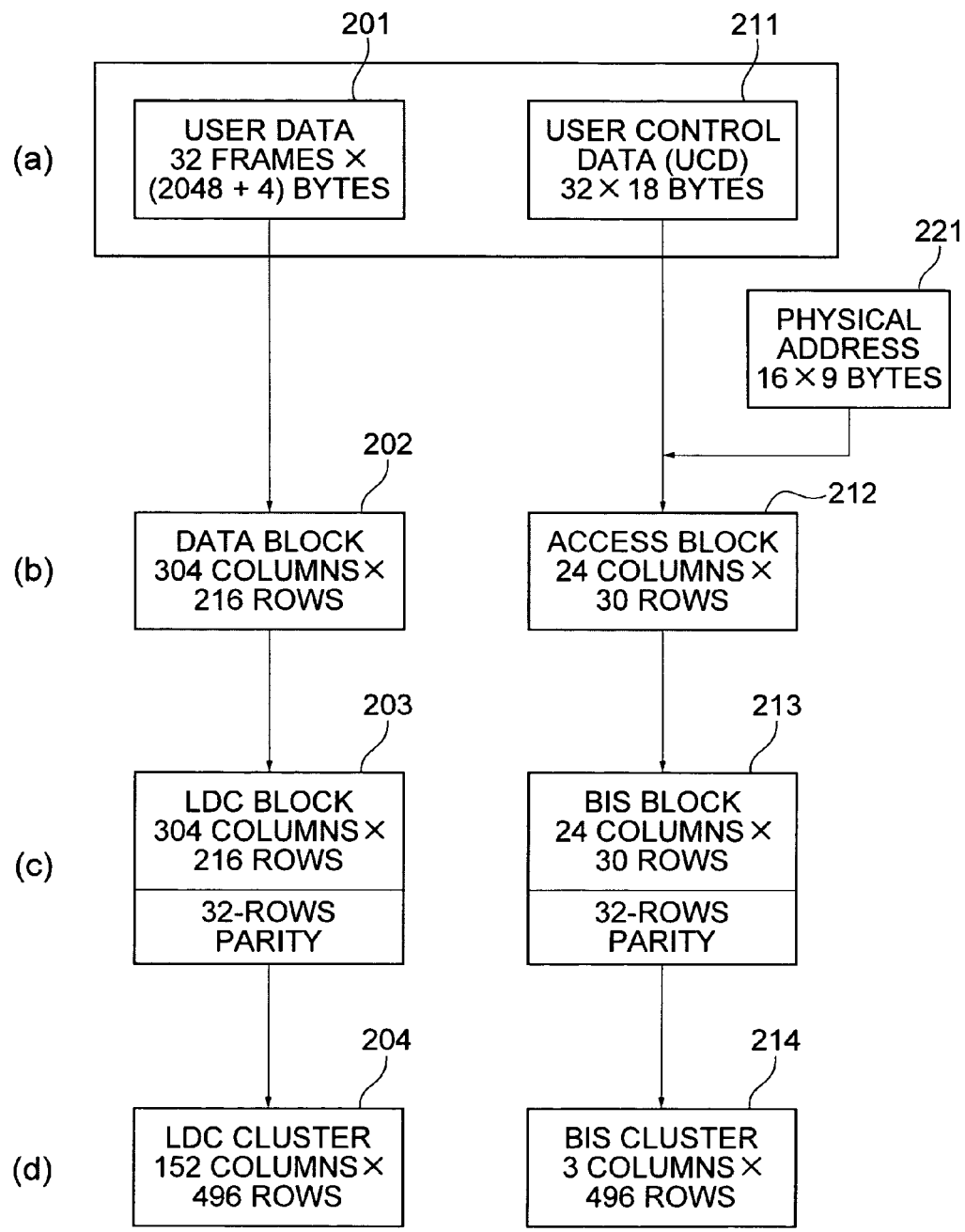
FIG. 2 is a first illustration of processing in the modulated data generating unit in the information recording processor shown in FIG. 1.

As shown in portion (a) of FIG. 2, the recording data is constituted by user data 201 as main data, and user control data 211. The user data 201 corresponds to the main data including the substantial data of data to be played back, such as content. The user control data 211 includes various types of control data such as playback-control information.

The user data 201 is set in 32-frame units, each consisting of 2048-byte data and 4-byte parity. The user control data 211 is formed by 32 units of 18-byte data.

Based on the user data 201, which has 32 frames by (2048+4) bytes, a data block 202 is formed. The data block 202 has an arrangement of 304 columns by 216 rows. One column by one row stores one-byte data (eight bits).

For the data block 202, an LDC block 203 is generated as a data block with parity of 32 rows added in each column. Interleaving processing on the LDC block 203 generates an LDC cluster 204 of 152 columns by 496 rows.

In addition, the user control data 211 is combined with physical address data 221 having 16 by 9 bytes to generate an access block 212 of 24 columns by 30 rows. After that, a BIS block 213 is generated as a data block in which parity of 32 rows is added in each column in the access block 212. Interleaving of the BIS block 213 generates a BIS cluster 214 of 3 columns by 496 rows.

Figure 3:
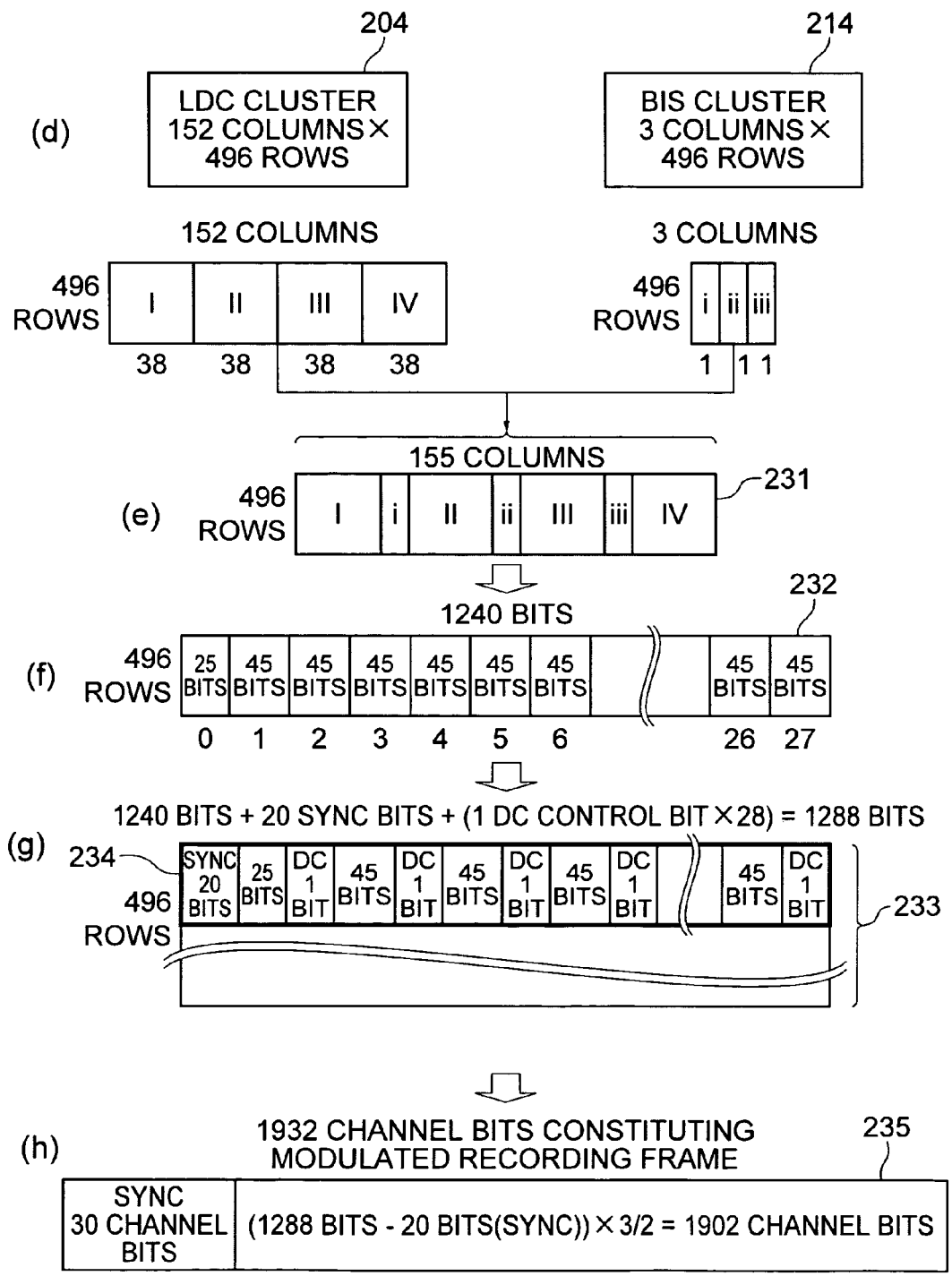
FIG. 3 is a second illustration of processing in the modulated data generating unit in the information recording processor shown in FIG. 1.

Portion (d) of FIG. 3 shows data identical to that shown in portion (d) of FIG. 2, that is, the LDC cluster 204 of 152 columns by 496 rows which is generated based on the user data 201, and the BIS cluster 214 of 3 columns by 496 rows.

As shown in portion (d) of FIG. 3, the LDC cluster 204 of 152 columns by 496 rows is divided into four parts I to IV in 38-column units. The BIS cluster 214 of 3 columns by 496 rows is divided into three parts i to iii in column units. By combining the parts I to IV and the parts i to iii, the ECC cluster 231, shown in portion (e) of FIG. 3, of 155 columns by 496 rows is generated.

As shown in portion (f) of FIG. 3, the ECC cluster 231 is set as a cluster 232 partitioned into 28 parts 0 to 27. Only part 0 has 25 bits, and the other parts 1 to 27 each have 45 bits. The numbers of bits, shown in portion (f) of FIG. 3, are values per row.

As shown in portion (g) of FIG. 3, a 20-bit synchronizing (Sync) part is set. In addition, in the parts 0 to 27 shown in portion (f) of FIG. 3, a one-bit DC-control-bit part is set between two parts.

This sets a physical cluster 233 of [1240 bits+20 bits (Sync)+(1 DC-control bit×28)=1288 bits]×496 rows. Each row of the physical cluster 233 is used as a recording frame 234 which is a modulated-data generating unit.

The DC control bits are a DC balance index of an NRZI transformation signal generated as a recording signal for the information recording medium 101. Specifically, by totaling bits of a recording bit series (NRZI transformation signal), with each bit "0" as "−1", and each bit "1" as "+1", the total is obtained and is used as a digital sum variation. After the DC control bit "0" or "1" is selectively inserted so that the divergence of the digital sum variation from "0" is minimum, the modulating processing is performed.

As described above, in the present invention, in this DC control bit setting, for a selected specific recording frame, that is, a frame in which pointer information of additional-data storing user control data is set, bit values selected by the DC-control-bit selecting unit 114 are set as DC control bits without using DC-control-bit setting in accordance with the above rule. In other words, row pointer or column pointer of additional-data storing user control data, which serves as user control data storing additional data, is set as the values of DC control bits. This is described in detail later.

Modulating processing on a frame in which the DC control bits, that is, the recording frame 234 shown in portion (g) of FIG. 3 which is formed by 1288-bit data, is performed. In the modulating processing, 2-bit data is transformed into 3-bit data. This data transformation executes (1, 7) RLL data transformation that produces modulated data in accordance with run-length limitation in which the number of consecutive 0's is a minimum of one and a maximum of seven, whereby the modulated recording frame 235 is generated.

The modulated recording frame 235, shown in portion (h) of FIG. 3, has a total of 1932 channel bits consisting of 30 (synchronizing) channel bits (modulated data bits) and 1902 channel bits consisting of (1288−20) synchronizing bits×⅔.

In the data modulating processing for transformation from 2-bit data to 3-bit data in accordance with the (1, 7) RLL run-length rule, a transformation table is used. A specific example of the transformation table is shown in FIG. 4.

As shown in FIG. 4, the transformation table indicates correspondence between strings of modulated data bits and corresponding strings of input bits. For example, when input data is "00000000", a corresponding string of modulated data bits is "010100100100". When input data is "11", if precedent modulated data bits are "xx1", corresponding modulated data bits are "000", and if precedent modulated data bits are "xx0", corresponding modulated data bits are "101".

By using this transformation table to execute transformation from 2-bit data into 3-bit data, modulated data bits is generated in accordance with the (1, 7) RLL run-length rule.

Referring back to FIG. 1, the configuration and processing of the information recording processor according to the embodiment of the present invention is continuously performed below.

In the modulated data generating unit 109 shown in FIG. 1, the modulated data generating processing, described with reference to FIGS. 2 to 4, is executed, and the recording-signal processing circuit 111 generates a recording signal based on the generated modulated data.

The recording-signal processing circuit 111 generates a NRZI signal in which the polarity of each pulse is inverted in response to the value "0" or "1" of the modulated data generated in the modulated data generating unit 109. The recording-signal processing circuit 111 records the NRZI signal as a recording signal on the information recording medium 101.

Figure 5A:
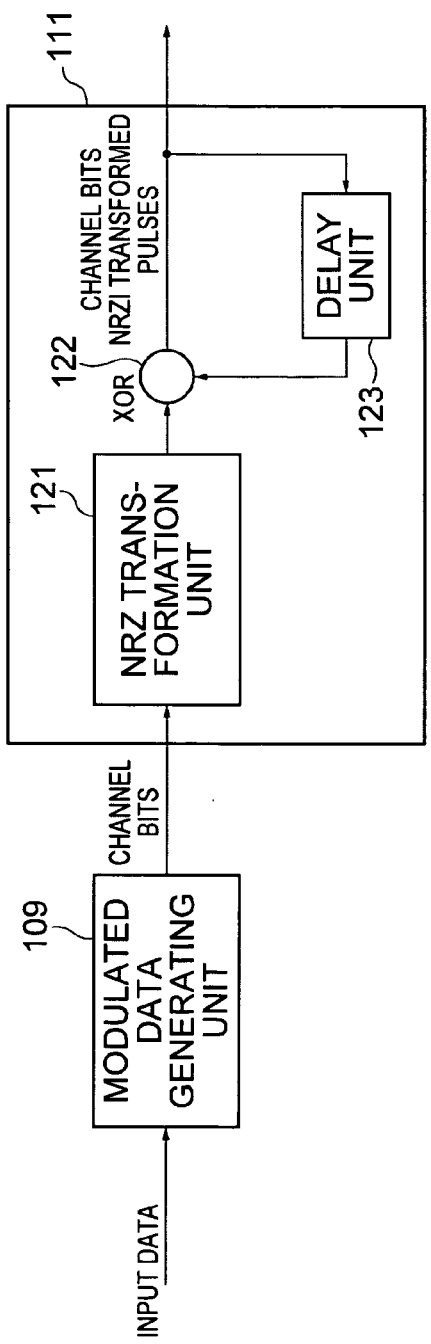
FIGS. 5A and 5B are illustrations of processing executed in the recording-signal processing circuit in the information recording processor shown in FIG. 1.
Figure 5B:
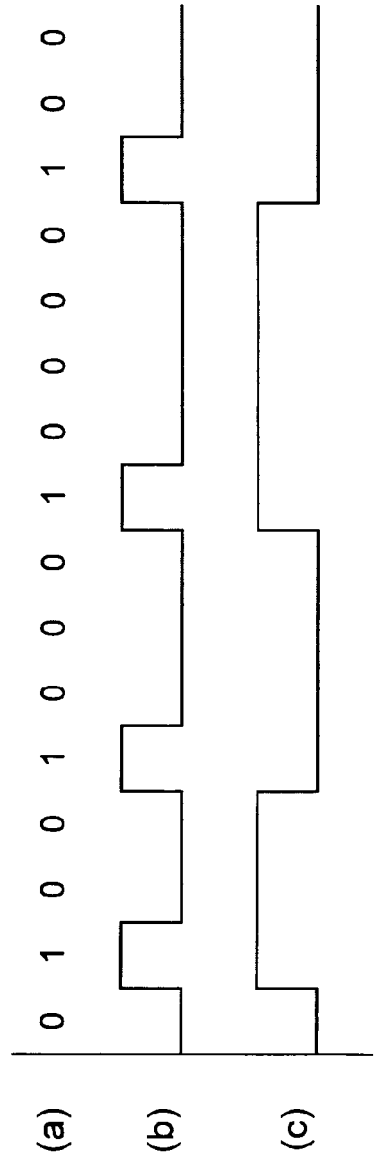

FIG. 5A shows the configuration of the recording-signal processing circuit 111 in which processing for generating the NRZI signal as a recording signal is executed. Channel bits output from the modulated data generating unit 109, which are modulated data bits, are input to the recording-signal processing circuit 111, which includes an NRZ transformation unit 121, an XOR 122, and a delay unit 123. In FIG. 5B, portion (a) shows channel bits, portion (b) shows an output signal from the NRZ transformation unit 121, and portion (c) shows NRZI transformed pulses which are finally output as a recording signal from the recording-signal processing circuit 111. The recording signal is output to the pickup 102, and recording information is recorded on the information recording medium 101 under the control of a servo circuit 104.

In the present invention, data composed of various types of information, such as additional data such as encryption-key information for use as an encryption key for encrypted content, information forming part of the encryption-key information, or encryption-key generating information such as the data (e.g., a seed) required for generating an encryption key, secret information such as a password, or control information such as content playback control information or copy-control information, is set as specific user control data, that is the bit values (8 bits) of the additional-data storing user control data.

The row pointer and column pointer, which serves as identification information of additional-data storing user control data, are acquired from DC control bits included in a recording frame storing pointer information of additional-data storing user control data.

When modulation of the recording frame storing the pointer information is executed in the modulated data generating unit 109, the pointer-information-recording-area control unit 107 shown in FIG. 1 controls the switch 108 to be on, so that DC-control-bit values forming the row pointer and column pointer selected by the DC-control-bit selecting unit 114 are output to the modulated data generating unit 109.

At DC-control-bit setting positions in the recording frame storing the pointer information, the modulated data generating unit 109 sets, not DC control bits having bit values determined based on the above DSV measurement, but the DC control bit value selected by the DC-control-bit selecting unit 114.

The configuration shown in FIG. 1 is shown in the form of a schematic block diagram illustrating the configuration and processing of the information recording processor according to the present invention. For example, processing, such as control processing for DC control bits to be set for pointer information, can be executed such that a controller, such as a central processing unit, executes a program describing a processing sequence. Accordingly, in the information recording processor according to the embodiment, hardware corresponding to the switch and other component blocks shown in FIG. 1 is not essential. The processing for generating the recording frame is executable on hardware including a CPU, which serves as a controller for executing processing in accordance with a predetermined program, and as a data processor, and a memory as a means of storing parameters, etc.

Additional data is, for example, data composed of various pieces of information, that is, encryption-key information for use as an encryption key for encrypted content, information forming partial data of the encryption-key information, encryption-key generating information, such as the data (e.g., a seed) required for generating an encryption key, secret information, such as a password, control information of various types, such as content-playback control information ad copy-control information. Accordingly, the additional data is, for example, a data string, such as "0, 0, 0, 1, 0, 0, 0, . . . ", forming each piece of information. Bit information forming the bit string of additional data is stored in specific user control data, that is, additional-data storing user control data, and pointer information, used as positional information of additional-data storing user control data, is set as DC control bits in a recording frame storing pointer information of additional-data storing user control data.

Storage of additional data and pointer information in the present invention is described below.

Figure 6:
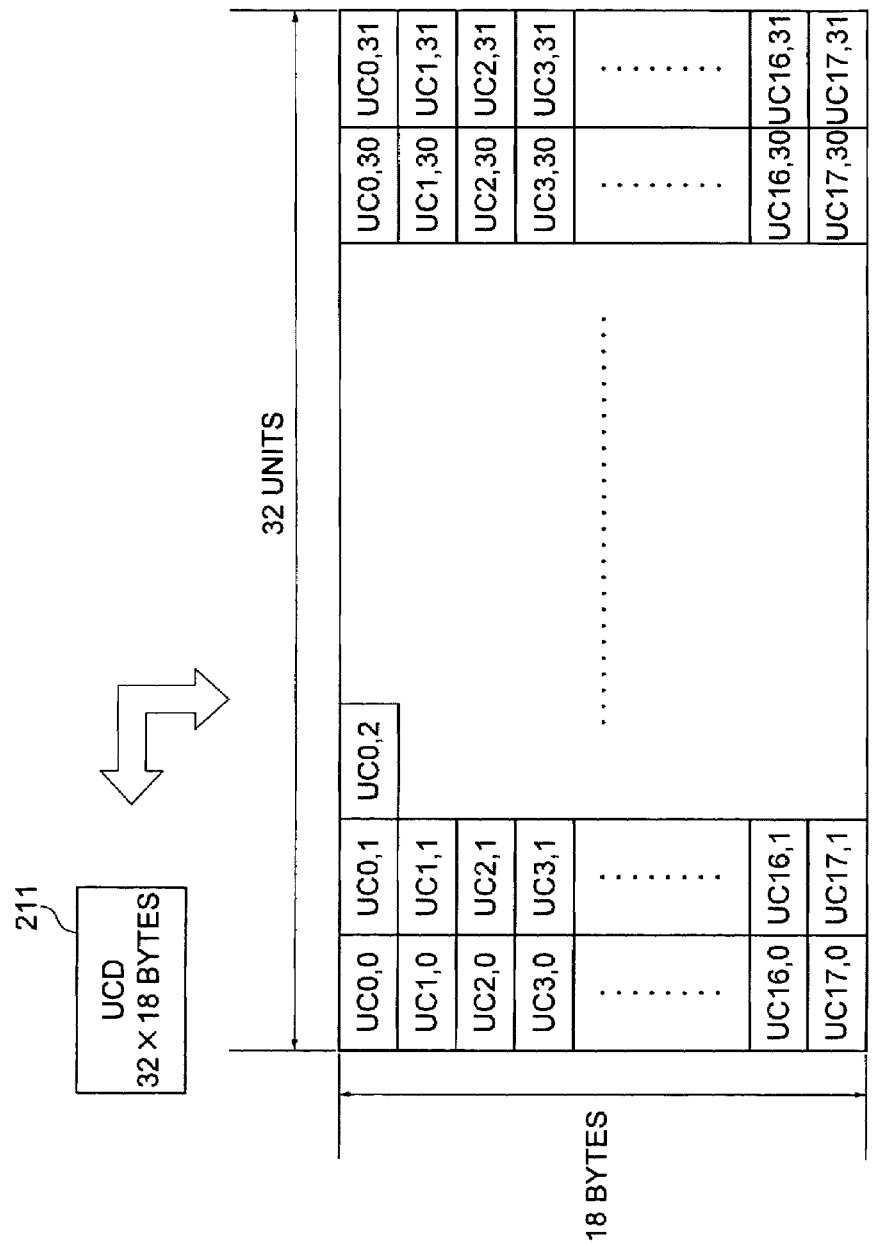
FIG. 6 is an illustration of detailed configurations of a BIS block and a BIS cluster.

FIG. 6 shows a detailed configuration of the user control data 211 including the control data, etc., in the modulated data generating processing described with reference to FIGS. 2 and 3.

As shown in FIG. 6, the user control data 211 is divided into (32 columns×18 rows=) 576 user control data items ("UC 0,0" to "UC 17,31"), each item having bit information of one byte (8 bits).

Each 8-bit user control data item is associated with a set of related information and control information used as identification information for user control data. As shown in FIG. 6, row numbers 0 to 17 and column numbers 0 to 31 are set. An information playback processor can identify and acquire a specific user control data item based on a row number and a column number.

In the information recording processor, one or more user control data items selected from (32 columns×18 rows) 576 user control data items ""UC 0,0" to "UC 17,31" are selected as additional-data-storing user control data, and additional data is stored in each user control data item, with the additional data divided into data of eight bits or less.

When user control data is recorded on the information recording medium (disk), processing, such as adding parity data and interleaving processing, is performed. In other words, as described with reference to FIGS. 2 and 3, by combining the physical address data 221 of 16×9 bytes with the user control data 211, the access block 212 of 24 columns by 30 rows is generated. After that, the BIS block 213 is generated as a data block in which parity of 32 rows is added in each column. This processing is described below with reference to FIG. 7 and the subsequent drawings.

Figure 7:
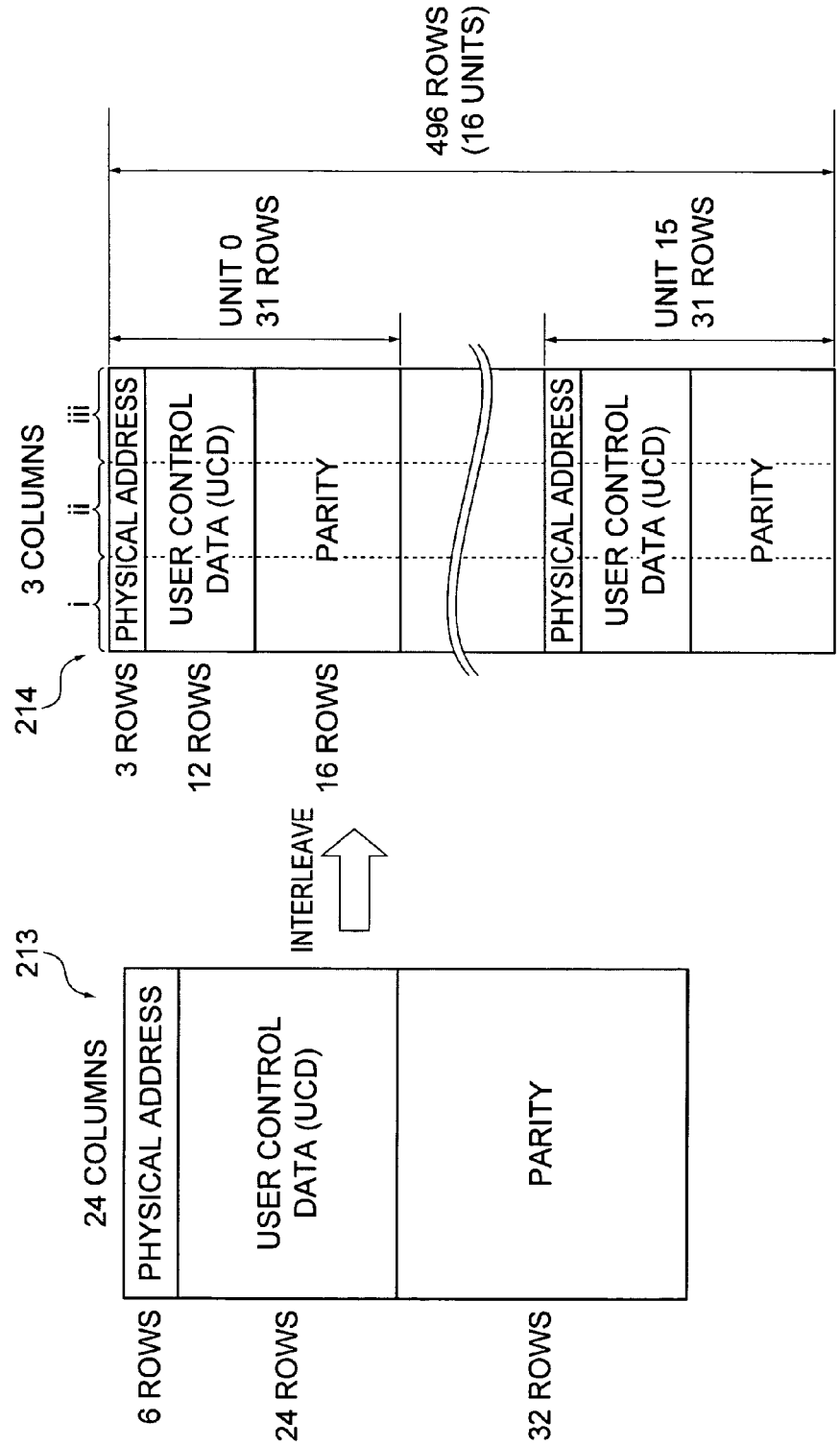
FIG. 7 is an illustration of the arrangement of user control data in a BIS block.

The BIS block 213 shown in FIG. 7 is formed by combining the physical address data 221 with the user control data 211 and adding parity.

By performing interleaving of the BIS block 213, the BIS cluster 214 of 3 columns by 496 rows is generated. The generated BIS cluster 214 is shown in FIG. 7.

As shown in FIG. 7, a 3-row physical address, 12-row user control data (UCD), and 16-row parity constitute one unit of 3 columns×31 rows. Sixteen units 0 to 15 constitute the BIS cluster 214 of 3 columns×496 rows.

Figure 8:
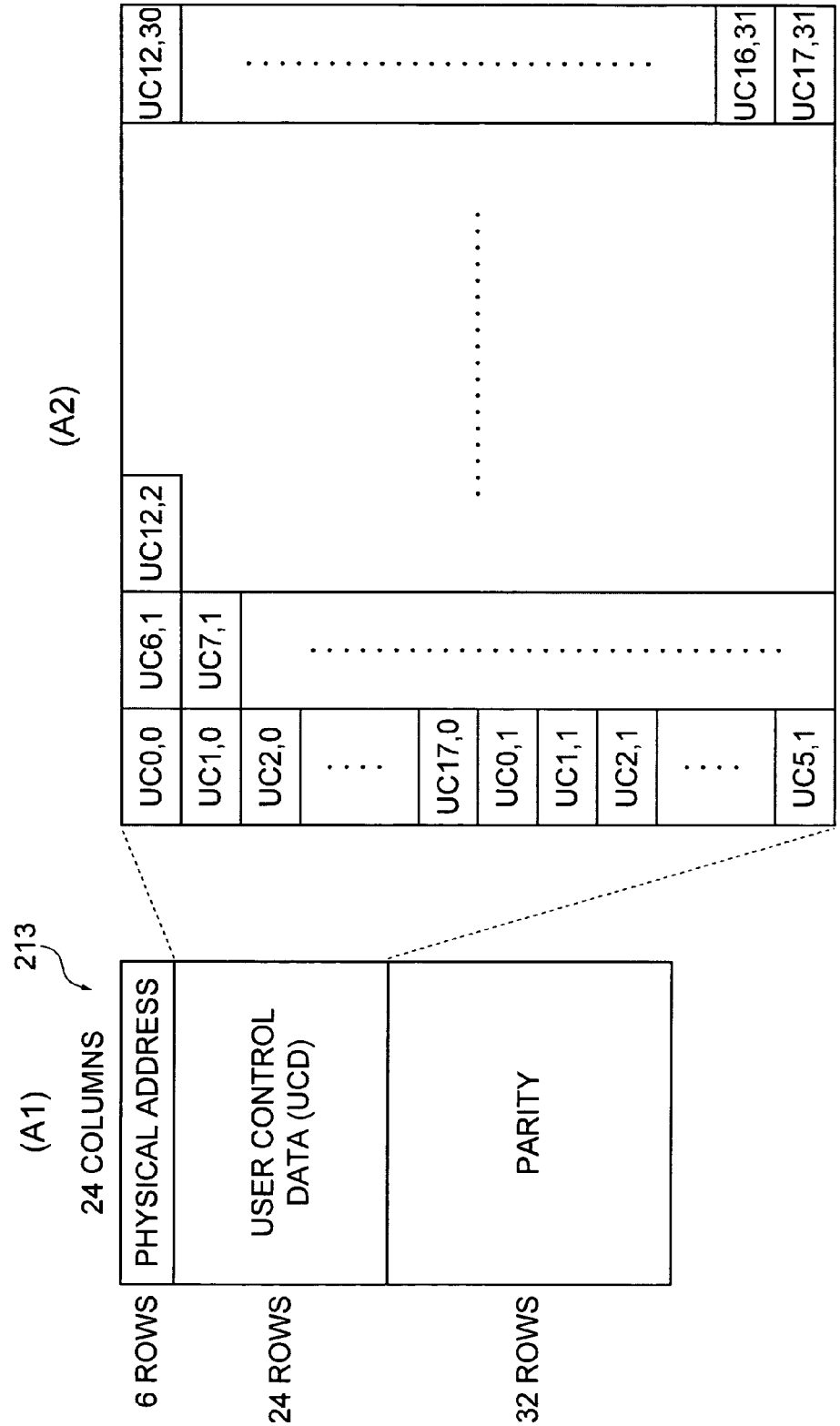
FIG. 8 is an illustration of the arrangement of user control data in a BIS cluster.
Figure 9:
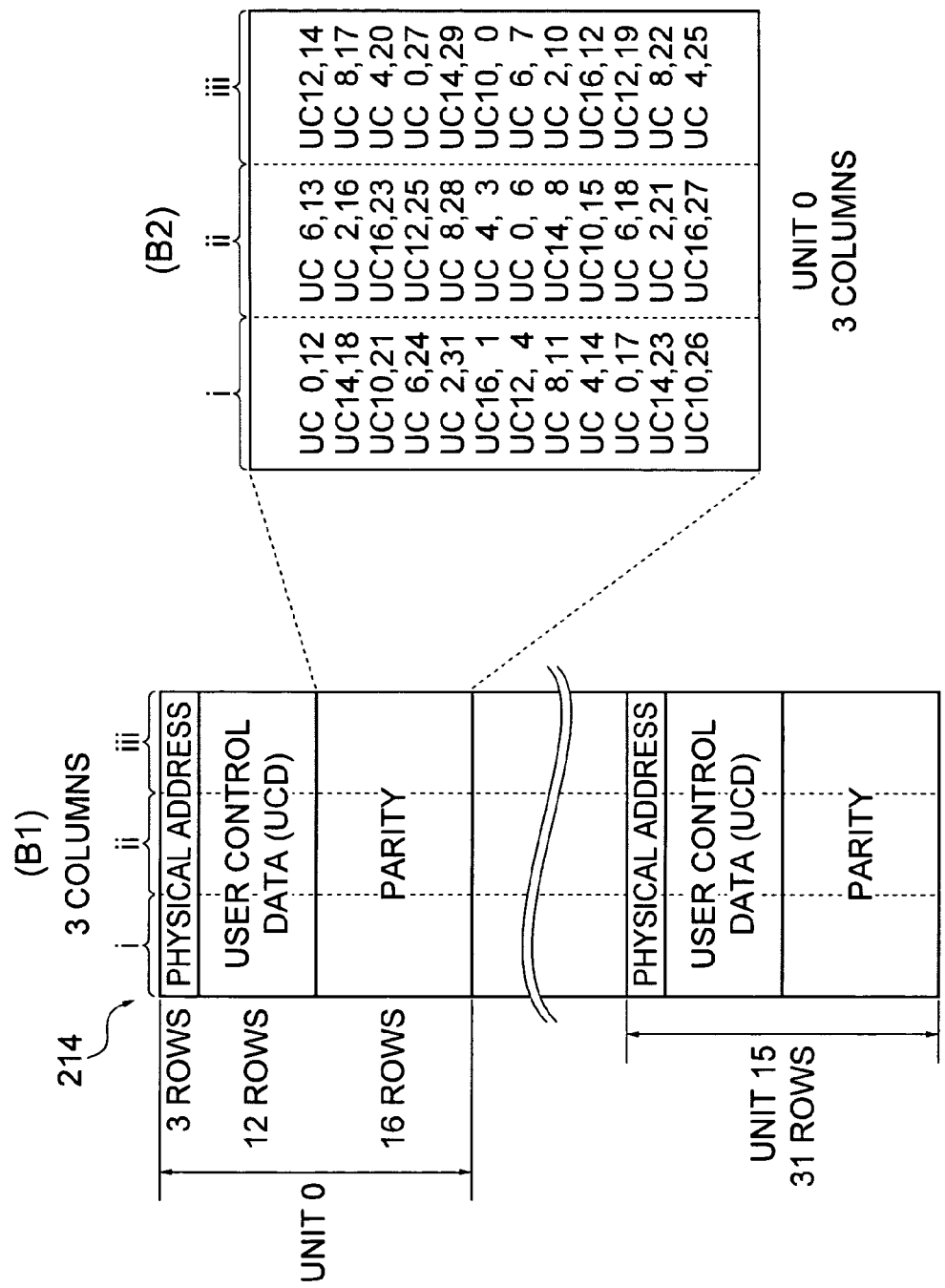
FIG. 9 is an illustration of processing for generating an ECC cluster based on the LDC cluster and a BIS cluster.

FIG. 8 shows details of the configuration in storage of the BIS block 213. FIG. 9 shows a detailed arrangement of user control data in the BIS cluster 214.

As shown in portion (A1) of FIG. 9, the BIS block 213 is constituted by a physical address of 24 columns×6 rows, user control data (UCD) of 24 columns×24 rows, and parity of 24 columns×32 rows.

As shown in portion (A2) of FIG. 8, the user control data (UCD) of 24 columns×24 rows is constituted by 576 (24×24) user-control-data-forming data items "UC0,0" to "UC17, 31", each data item having one byte (8 bits). By performing interleaving of the BIS block 213 having the user control data arrangement of 24 columns×24 rows, the BIS cluster 214 is generated.

As shown in portion (B1) of FIG. 9, the BIS cluster 214 has an arrangement of 3 columns×496 rows. A 3-row physical address and 12-row user control data (UCD), and 16-row parity constitute one unit of 3 columns×31 rows. Sixteen units 0 to 16 constitute the BIS cluster 214 of 3 columns×496 rows.

Portion (B2) of FIG. 9 shows user control data of 3 columns×12 rows in unit 0. The user control data in unit 0 stores 36 (3×12) user-control-data-forming data items "UC0,12" to "UC4,25", each data item having one byte. Each of sixteen units 0 to 15 stores 36 (3×12) user-control-data-forming data items. Accordingly, the BIS cluster 214 stores a total of (36× 16) 576 user-control-data-forming data items.

The user-control-data-forming data items stored in the BIS cluster 214 are arranged in distributed form in units 0 to 15 in the BIS cluster 214 by performing the interleaving of the BIS block 213 shown in portion (A2) of FIG. 8.

The user control data is set as a storage area for storing various types of information, such as content-playback control information, and its part is set as a reserve area or the like, in which arbitrary data can be written.

Figure 10:
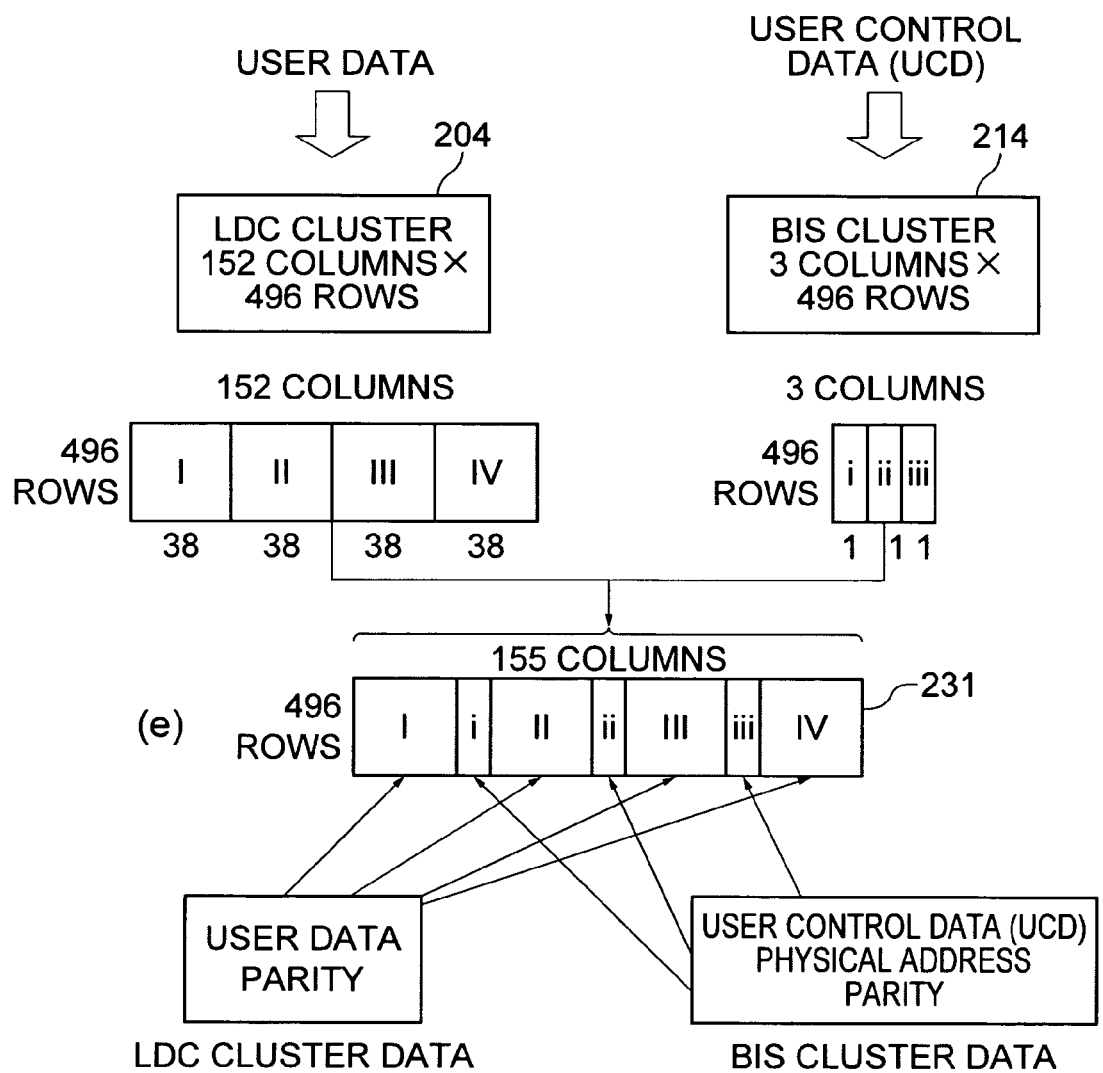
FIG. 10 is an illustration of the configurations of an additional-data-storing-user-control-data pointer-information-set recording frame and a recording frame storing user control data for determining correlation with additional data.

As shown in FIG. 10, each column of the BIS cluster 214 including the user control data is inserted among four-divided data items I to IV of the LDC cluster 204 set based on the user data such as content (as described with reference to FIGS. 2 and 3), whereby the ECC cluster 231 is generated.

As shown in FIG. 10, the ECC cluster 231 is set as a cluster in which a BIS cluster 214 of 3 columns×496 rows is combined with an LDC cluster 204 of 152 columns×496 rows.

As described with reference to FIG. 7, etc., one of the physical address, the user control data, and the parity is set as each column of the BIS cluster. Therefore, the BIS cluster (i, ii, iii) included in each of 496 rows of the ECC cluster 231 is a type of data among a physical address, user control data, and parity.

Figure 11:
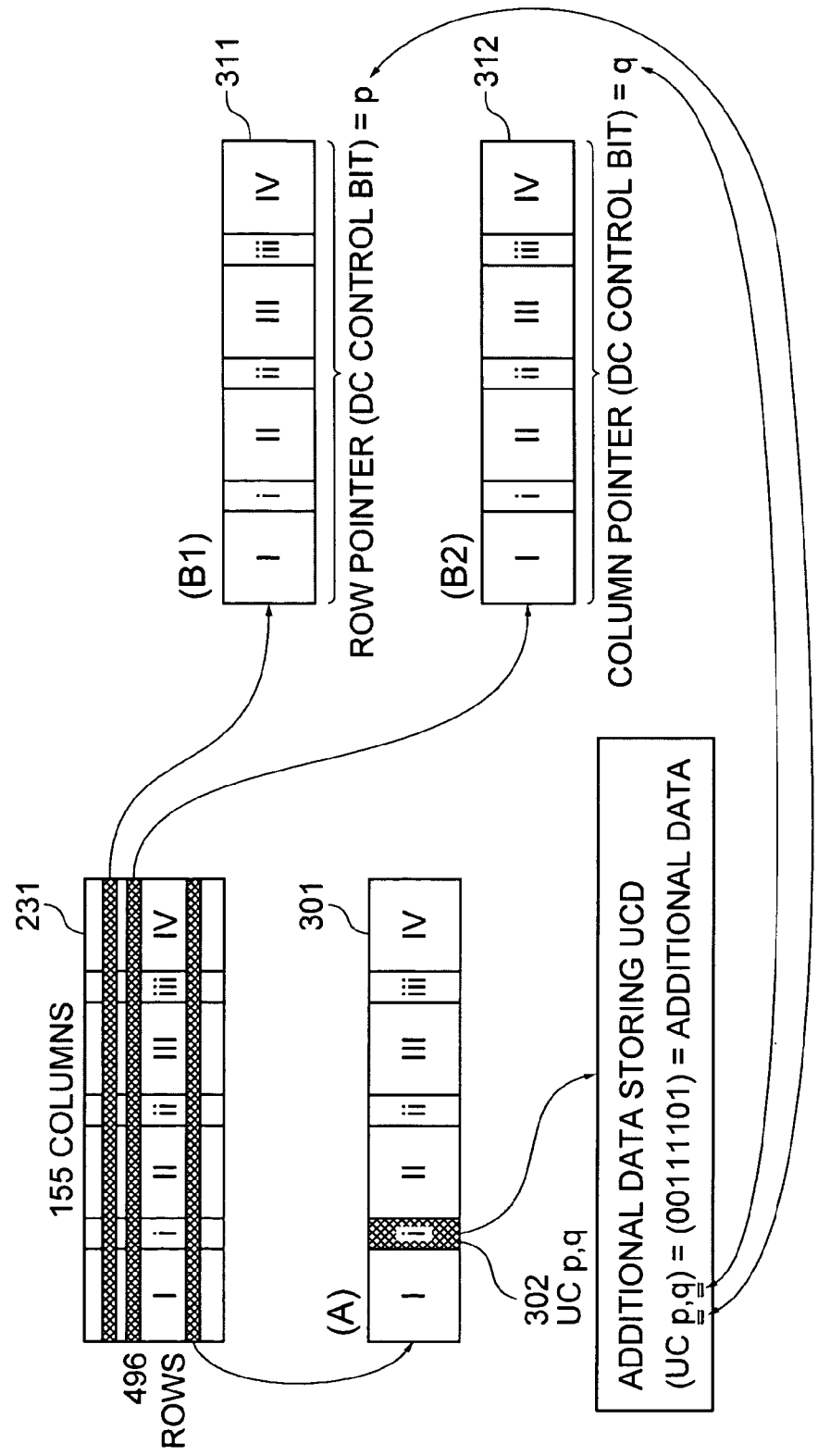
FIG. 11 is an illustration of setting, based on the values of additional data component bits, of DC control bits in an additional-data-storing-user-control-data pointer-information-set recording frame.

In the present invention, as shown in FIG. 11, a specific row selected from 496 rows constituting the ECC cluster 231 is set as (A) additional-data-storing-user-control-data-set frame 301 including an additional-data-storing user control data 302.

When the additional-data-storing user control data 302 corresponds to one user control data item described with reference to FIG. 6, and is a user control data item having a row number of p and a column number of q, that is, "UC p,q", a frame in which the row pointer "p" of the additional-data-storing user control data 302 ("UC p,q") is set as a DC control bit, and a frame in which the column pointer "q" of the additional-data-storing user control data 302 ("UC p,q") is set as a DC control bit are set. These frames are respectively referred to as:

(B1) the additional-data-storing-user-control-data row-pointer-information-set frame 311; and (B2) the additional-data-storing-user-control-data column-pointer-information-set frame 312.

DC control bits are selected so that a value represented by DC control bits set in (B1) the additional-data-storing-user-control-data row-pointer-information-set frame 311 is the row number "p" of the additional-data-storing user control data "UC p,q", and a value represented by DC control bits set in (B2) the additional-data-storing-user-control-data column-pointer-information-set frame 312 is the column number "q" of the additional-data-storing user control data "UC p,q". The DC-control-bit selecting processing is executed by the DC-control-bit selecting unit 114 (shown in FIG. 1) based on the row and column numbers of a user control data item storing additional data.

Bit information determined based on the row and column numbers of the user control data item storing additional data is input from the DC-control-bit selecting unit 114 to the modulated data generating unit 109 through the switch 108. The DC control bits having the information are set in the additional-data-storing-user-control-data pointer-information-set frame.

Although FIG. 11 shows that (A) the additional-data-storing-user-control-data-set frame 301, (B1) the additional-data-storing-user-control-data row-pointer-information-set frame 311, and (B2) the additional-data-storing-user-control-data column-pointer-information-set frame 312 are set as three different frames, these frames may be collectively set as one or two frames.

A detailed configuration of the additional-data-storing-user-control-data pointer-information-set frame is described below with reference to FIGS. 12A and 12B.

Figure 12:
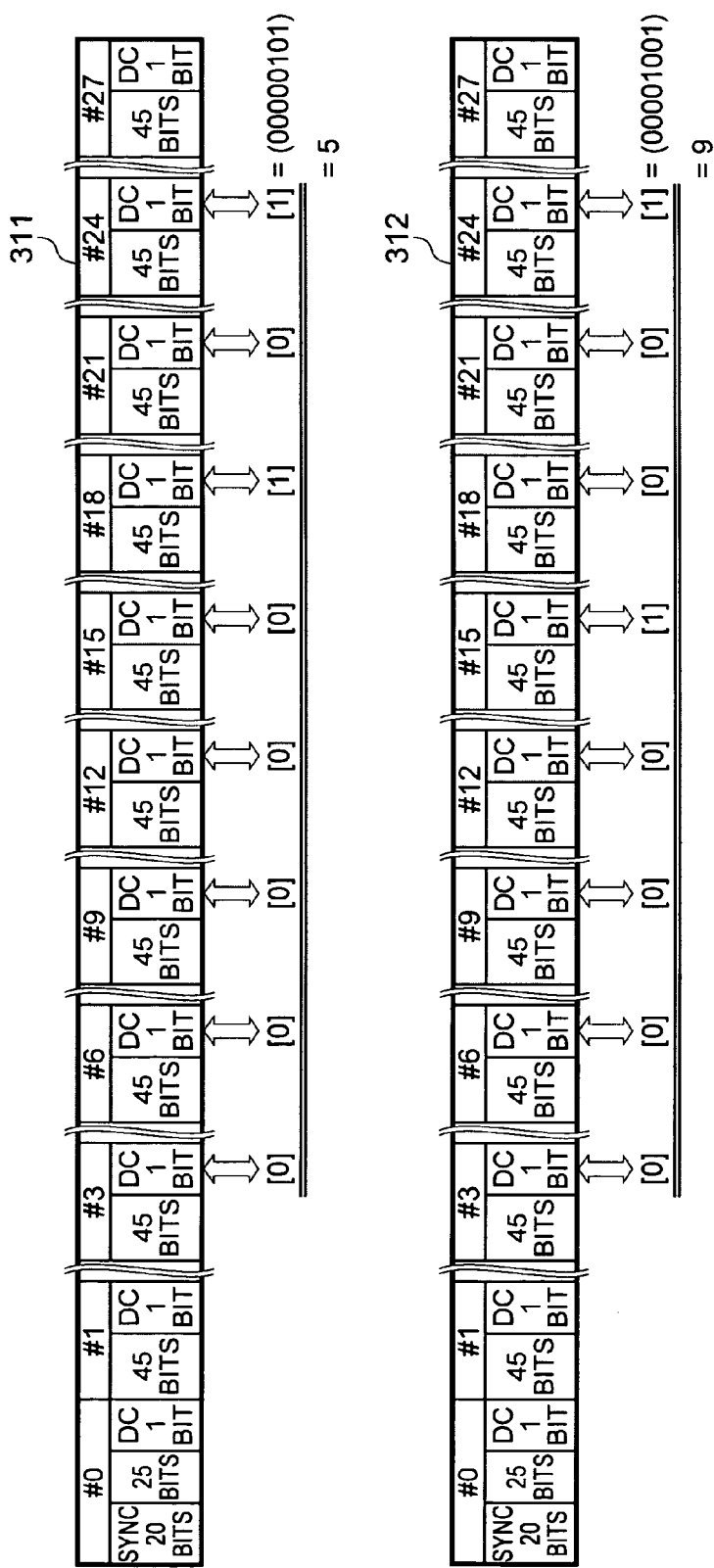
FIG. 12 is an illustration of correspondence among DC control bits for determining correlation, correlation of user control data bits for determining correlation, and additional data bits.

By way of example, FIG. 12A shows a case in which the additional-data-storing user control data is "UC 5,9", and FIG. 12B shows an additional-data-storing-user-control-data row-pointer-information-set frame in the case of "UC 5,9", and an additional-data-storing-user-control-data column-pointer-information-set frame.

As shown in FIG. 12A, the additional-data-storing user control data is "UC 5,9", that is, user control data having the row number 5 and the column number 9, and additional data, such as encryption-key information, is set therein as 8-bit data ("0011101"). Entire data of, for example, encryption-key information, can be generated by connecting sets of 8-bit data in plural items of the additional-data-storing user control data. Accordingly, on the information recording medium, the plural items of the additional-data-storing user control data are set and row-pointer-information and column-pointer-information-set frames corresponding to each item are set.

In the additional-data-storing-user-control-data row-pointer-information-set frame 311 shown in FIG. 12B, row-pointer information of the additional-data-storing user control data "UC 5,9" which represents 5 is set in the form of DC control bits.

The recording frame is divided into 28 frame parts #0 to #27, as described above with reference to FIG. 3. In part #0, synchronization (Sync) bits (20 bits) and 25-bit data are stored. In the other frame parts #1 to #27, 45-bit data is stored. In each of frame parts #1 to #27, a DC control bit (1 bit) is set.

In the additional-data-storing-user-control-data row-pointer-information-set frame 311, some of the 28 DC control bits are set as bit values corresponding to additional-data-storing-user-control-data row-pointer information.

In the example shown in FIG. 12B, row-pointer information representing the row information "5" of the additional-data-storing user control data "UC 5,9" is set. Specifically, the binary bit string "00000101" which represents 5 is set as the values of DC control bits in eight frame parts #3, #6, #9, #12, #15, #18, #21, and #24.

Although FIG. 12B shows that the eight frame parts #3, #6, #9, #12, #15, #18, #21, and #24 are set as pointer-information-storing positions, the pointer-information-storing positions are only illustrative, and may be predetermined positions used as arbitrary positions.

In the additional-data-storing-user-control-data column-pointer-information-set frame 312, some of 28 DC control bits #0 to #27 are set as bit values corresponding to additional-data-storing-user-control-data column-pointer information.

In the example shown in FIG. 12B, row-pointer information which represents the column information "9" of the additional-data-storing user-control-data "UC 5,9" is set in the form of DC control bits. Specifically, the binary bit string "00001001" which represents 9 is set as the values of DC control bits in eight frame parts #3, #6, #9, #12, #15, #18, #21, and #24.

When valid playback-processing program is executed, by reading the DC control bits at the bit positions, row information and column information, which serve as additional-data-storing-user-control-data identifiers, are acquired. Based on the acquired pointer information, user control data is specified and additional data is acquired from the specified user control data. Details of the playback processing are described later.

As described above, in the present invention, part of user control data included in data to be recorded on the recording medium is set as additional-data-storing user control data, and pointer information for identifying the additional-data-storing user control data is set in the form of DC control bits in the additional-data-storing-user-control-data row-pointer-information-set frame 311 and the additional-data-storing-user-control-data column-pointer-information-set frame 312.

Additional data recording processing, based on additional-data-storing user control data on a recording medium (disk) 361 and additional-data-storing-user-control-data pointer information, is described below with reference to FIG. 13.

On the recording medium 361, main data such as content, and a plurality of ECC clusters (see FIG. 3) generated based on user control data such as control information are set. Recording-data generating processing is executed in each cluster unit. A recording frame having DC control bits set therein is set, and a recording signal based on the recording frame is generated and recorded.

In the case of recording additional data in the configuration of the present invention, one additional-data-storing user control data is set in, for example, ECC cluster-A 371. For example, it is assumed that eight bits of the user control data "UC 0,0" are used as a user control data item included in the ECC cluster-A 371, and are set as additional-data-storing user control data 381. One frame included in ECC cluster-A 371 is set as an additional-data-storing-user-control-data row-pointer-information-set frame 382-1, and the other frame is set as an additional-data-storing-user-control-data column-pointer-information-set frame 382-2.

Based on the DC control bits in the additional-data-storing-user-control-data row-pointer-information-set frame 382-1 and additional-data-storing-user-control-data column-pointer-information-set frame 382-2, the user control data 381 is specified, and from the user control data 381, additional data, such as encryption-key information, is acquired.

In this configuration, one ECC cluster is used to acquire 8-bit-additional-data bit information. In the case of a disk containing N ECC clusters, additional data having 8×N can be recorded.

Figure 13:
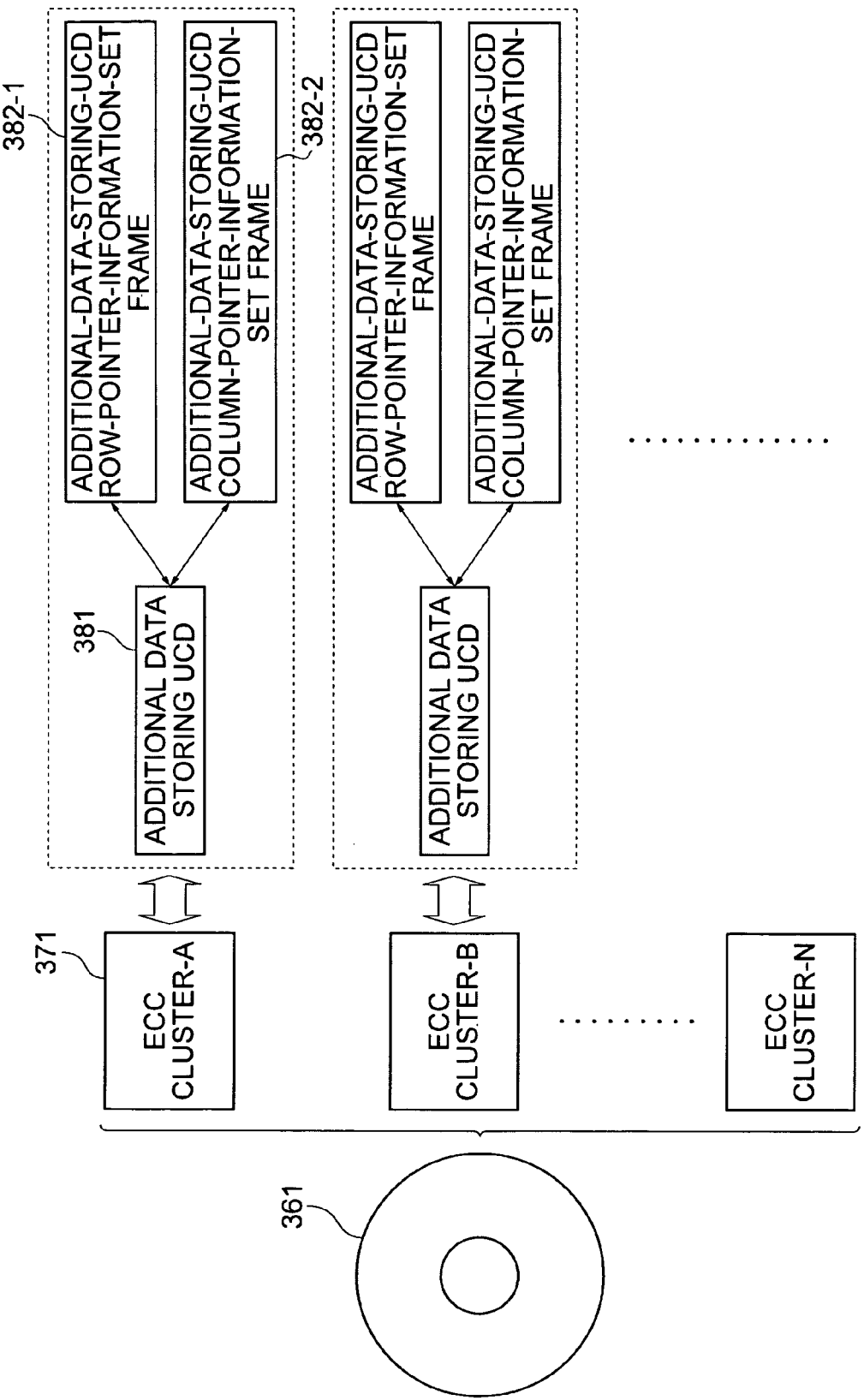
FIG. 13 is an illustration of the configurations of an additional-data-storing-user-control-data pointer-information-set recording frame and a recording frame storing user control data for determining correlation with additional data, the recording frames being recorded on an information recording medium.

Although FIG. 13 shows a setting example in which only one additional-data-storing user control data item is set one ECC cluster, a plurality of additional-data-storing user control data items may be set in one ECC cluster. In this case, an additional-data-storing-user-control-data row-pointer-information-set frame and an additional-data-storing-user-control-data column-pointer-information-set frame which correspond to each additional-data-storing user control data item are set.

In one frame, additional-data-storing-user-control-data row-pointer information and additional-data-storing-user-control-data column-pointer information may be set by using DC control bits, whose number is 28 or less, without separately setting the additional-data-storing-user-control-data row-pointer-information-set frame and the additional-data-storing-user-control-data column-pointer-information-set frame.

The pointer-information-recording-area control unit 107 shown in FIG. 1 identifies the additional-data-storing-user-control-data pointer-information-set frame on the basis of information set beforehand. When the modulated data generating unit 109 performs modulating processing on the additional-data-storing-user-control-data pointer-information-set frame, the pointer-information-recording-area control unit 107 changes over the switch 108 to control the DC-control-bit selecting unit 114 to output the values of DC control bits to be set in the additional-data-storing-user-control-data pointer-information-set frame to the modulated data generating unit 109.

Based on row information and column information of additional-data-storing user control data, the DC-control-bit selecting unit 114 calculates bit values corresponding to both information, and outputs, to the modulated data generating unit 109, the calculated values as the values of DC control bits to be set in the additional-data-storing-user-control-data pointer-information-set frame.

Based on the bit values input from the DC-control-bit selecting unit 114, the modulated data generating unit 109 generates a recording frame by setting bit values corresponding to the pointer information at specific DC-control-bit setting positions in the additional-data-storing-user-control-data pointer-information-set frame, and performs modulation.

Figure 14:
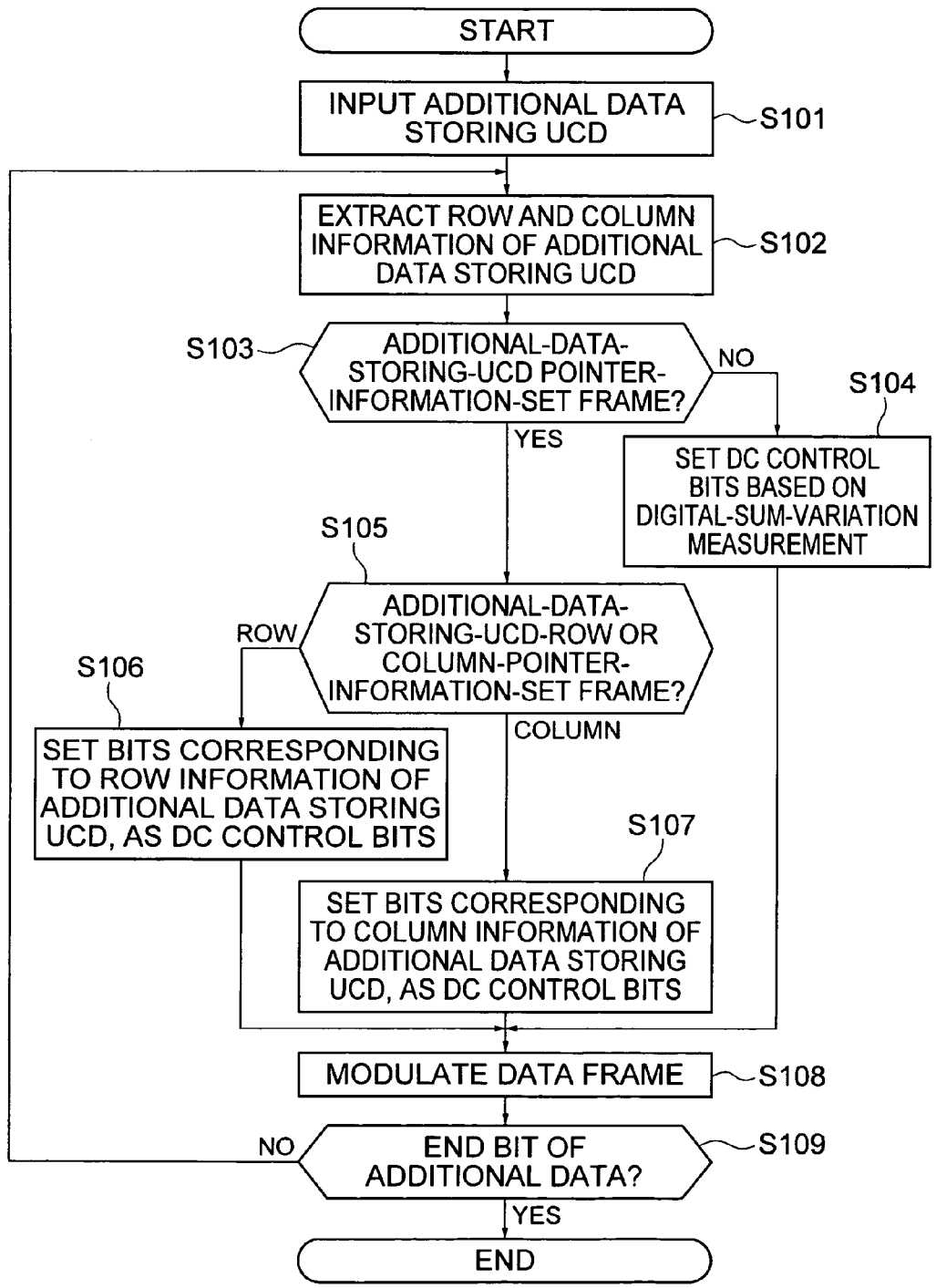
FIG. 14 is a flowchart illustrating an additional data recording process of an information recording processor of the present invention.

An additional data recording process executed in the information recording processor according to the embodiment of the present invention is described below with reference to FIG. 14.

In step S101, user control data storing additional data is input. The user control data is input to the error-correcting-encoding-and-interleaving unit 112 and DC-control-bit selecting unit 114 shown in FIG. 1. The additional data includes various information such as encryption-key information, encryption-key generating information, content-playback control information, copy-control information, or content-attribute information.

In step S102, a row number and a column number which are identification information of the additional-data-storing user control data are extracted.

In step S103, in modulated data generation by the modulated data generating unit 109, it is determined whether timing for modulating the additional-data-storing-user-control-data pointer-information-set frame has been detected. This determination is performed in the pointer-information-recording-area control unit 107 shown in FIG. 1.

If the process has determined that the timing has not been detected ("No" in step S103), in step S104, DC-control-bit setting processing based on ordinary digital sum variation measurement is executed by the modulated data generating unit 109, whereby a recording frame is generated.

If the process has determined that the timing has been detected ("Yes" in step S103), in step S105, the type of the modulating timing is identified as one of timing for modulating an additional-data-storing-user-control-data row-pointer-information-set frame and an additional-data-storing-user-control-data column-pointer-information-set frame. This is performed by the pointer-information-recording-area control unit 107 shown in FIG. 7.

When the detected timing is identified as the timing for modulating the additional-data-storing-user-control-data row-pointer-information-set frame, in step S106, at least part of DC control bits set in the additional-data-storing-user-control-data row-pointer-information-set frame is selected and set as bit values corresponding to the row number of the additional-data-storing user control data. For example, at DC-control-bit setting positions in eight frame parts #3, #6, #9, #12, #15, #18, #21, and #24 in the additional -data-storing-user-control -data row-pointer-information-set frame 311, pieces of bit information corresponding to an additional-data-storing-user-control-data row pointer are set.

The bit-value selecting processing is executed by the DC-control-bit selecting unit 114 (shown in FIG. 1) based on the row number of the additional-data-storing user control data. The selected bit values are input to the modulated data generating unit 109 through the switch 108, and the modulated data generating unit 109 sets, at the DC-control-bit setting positions in the additional-data-storing-user-control-data row-pointer-information-set frame, bit values corresponding to the input information.

In step S105, the detected timing is identified as the timing for modulating the additional-data-storing-user-control-data column-pointer-information-set frame, in step S107, at least part of DC control bits set in the additional-data-storing-user-control-data column-pointer-information-set frame are selected and set as bit values corresponding to the column number of the additional-data-storing user control data. This bit value selecting processing is executed by the DC-control-bit selecting unit 114 (shown in FIG. 1) based on the column number of the additional-data-storing user control data. The selected bit values are input to the modulated data generating unit 109 through the switch 108, and the modulated data generating unit 109 sets, at the DC-control-bit setting positions in the additional-data-storing-user-control-data column-pointer-information-set frame, bit values corresponding to the input information.

DC control bits at positions other than the DC-control-bit setting positions corresponding to the pointer information of the additional-data-storing-user-control-data pointer-information-set frame are set to have values based on ordinary digital-sum-variation measurement.

The modulated data generating unit 109 selectively executes the DC-control-bit setting corresponding to the pointer information and the DC-control-bit setting based on the ordinary digital-sum-variation measurement.

The process proceeds to step S108, and executes modulation of the additional-data-storing-user-control-data pointer-information-set frame and other recording frames.

In step S109, it is determined whether processing on the end bit of the additional data has finished. When there is unprocessed data, step S102 and the subsequent steps are repeatedly executed.

If the process has determined in step S109 that there is no unprocessed data, the process ends. In other words, in accordance with the above-described processing, recording data storing the additional-data-storing user control data and the additional-data-storing-user-control-data pointer information is generated.

Next, the configuration and playback processing of an information playback processor for performing a process of playing back an information recording medium containing the above-described additional data and content (main data) such as movie and music are described below.

The configuration and process of the information playback processor are described with reference to FIG. 15.

The information playback processor includes an information recording medium 401, a pickup 403 for reading data from the information recording medium 401, a spindle motor 402 for driving the information recording medium 401, a servo circuit 404 for controlling the pickup 403 and the spindle motor 402, an RF circuit unit 405 for performing signal processing, such as gain adjustment of a read signal, and generating an RF signal, a synchronization detecting unit 406 for extracting a synchronizing signal from the RF signal, a data-demodulation processing unit 407 for executing a data demodulating process, a switch 410 for outputting only an area of a recording frame storing pointer information of additional data, a pointer-information-recording-area detecting unit 411 for detecting the area of the recording frame storing the pointer information and controlling the switch 410, an additional-data decoding unit 408 for executing an additional data decoding process, a data dividing unit 412 which, based on demodulated data output from the data-demodulation processing unit 407, divides main data and user control data, an error-correcting-and-deinterleaving unit 413 for main data which performs error correction of main data and a deinterleaving process, an error-correcting-and-deinterleaving unit 414 for user control data which performs error correction of user control data and a deinterleaving process, and an additional-data error-correcting unit 409 for performing an additional-data error-correction process.

The content data recorded on the information recording medium 401 is, for example, encrypted content data. The additional data recorded on the information recording medium 401 includes, for example, various information, such as encryption-key information for use as an encryption key for encrypted content, information constituting part of the encryption-key information, encryption-key generating information such as the data (e.g., seed) required for generating an encryption key, secret information such as a password, or control information such as content-playback control information or copy-control information, and other content-attribute information. The additional data is stored in distributed form in the additional-data storing user control data.

Data read from the information recording medium 401 through the pickup 403 is processed (signal processing such as gain adjustment) in the RF circuit unit 405, and the processed signal is input to the synchronization detecting unit 406. The synchronization detecting unit 406 detects a synchronizing signal from the recorded signal and outputs the detected signal to the pointer-information-recording-area detecting unit 411.

Based on the synchronizing signal input from the synchronization detecting unit 406, the additional-data-recording-area detecting unit 411 identifies the area of the frame in which additional data pointer information is set, and controls the switch 410 based on the identification information. By controlling the switch 410, the recording frame required for decoding additional data pointer information, that is, a recording frame having set pointer information of user control data storing additional data having DC-control-bit information set therein, which corresponds to pointer information of user control data storing additional data, is input from the data-demodulation processing unit 407 to the additional-data decoding unit 408, which executes an additional data decoding process.

Based on the additional-data-storing-user-control-data pointer-information-set recording frame, which is input from the data-demodulation processing unit 407 through the switch 410, and user control data for determining correspondence with additional data which is input from the error-correcting-and-deinterleaving unit 414 for user control data, the additional-data decoding unit 408 detects the correspondence between the pointer information of user control data storing additional data and the bit information of user control data, that is, whether both are coincident, and executes a decoding process for acquiring the additional data.

In other words, an additional-data-component-bit identifying process is performed in which, when the pointer information of user control data storing additional data is coincident with the bit information of user control data, the additional data component bit="0", and, when both are not coincident, the additional data component bit="1".

As described above in the configuration of the information recording processor, in a case in which, when the pointer information of user control data storing additional data is correlated with the user control data for determining correspondence with additional data, that is, when there is coincidence between both, a recording process is performed with the eight bits of the user control data set as additional data component bits, the additional-data decoding unit 408 determines whether both are correlated with each other, and acquires, based on the affirmative determination, bits constituting the user control data (determining correspondence) as additional data component bits.

In the playback processor, when data processed by the data-demodulation processing unit 407 is a additional-data-storing-user-control-data pointer-information-set recording frame, the data of the frame is input to the additional-data decoding unit 408 through the switch 410. the additional-data decoding unit 408 acquires specific DC control bits of the additional-data-storing-user-control-data pointer-information-set recording frame, acquires the row number and column number of user control data storing additional data from the acquired DC control bits, and acquires, from the error-correcting-and-deinterleaving unit 414 for user control data, user control data corresponding to the acquired row number and column number. The additional-data decoding unit 408 executes processing for reading additional data from the acquired user control data. While the data-demodulation processing unit 407 is executing processing the additional-data-storing-user-control-data pointer-information-set recording frame, the pointer-information-recording-area detecting unit 411 controls the switch 410 to be on.

By executing similar processing based on the additional-data-storing-user-control-data pointer-information-set recording frame, which is intermittently input, the additional-data decoding unit 408 acquires data including various information, such as n-bit information used as key information, information forming partial data of the key information, encryption-key generating information such as the data (e.g., a seed) required for generating an encryption key, secret information such as a password, various control information such as control-playback information or copy-control information, or content-attribute information. As mentioned in the above description of the information recording processor, the additional data includes error-correcting codes. The additional data is output after the additional-data error-correcting unit 409 performs error correction.

When the additional data is key information for use in, for example, content decryption, it is output to a decrypting processing unit for executing a content decrypting process. When the additional data is content-playback control information, it is output to a playback control unit.

In addition, ordinary data other than the additional data is output from the synchronization detecting unit 406 to the data-demodulation processing unit 407. By sequentially executing data conversion inverse to that described with reference to FIGS. 2 and 3, the data-demodulation processing unit 407 acquires playback data.

Based on demodulated data output from the data-demodulation processing unit 407, the DCT unit 412 divides the main data and the user control data. The error-correcting-and-deinterleaving unit error-correcting-and-deinterleaving unit 413 for main data executes error correction and the deinterleaving process on the main data. The error-correcting-and-deinterleaving unit 414 for user control data executes error correction and the deinterleaving process on the user control data, and outputs the processed user control data.

When the output main data is, for example, encrypted content, the encrypted content is decrypted by using an encryption key generatable based on key-generating information output as additional data, and the decrypted content is output through an output unit such as a display and a speaker.

Figure 15:
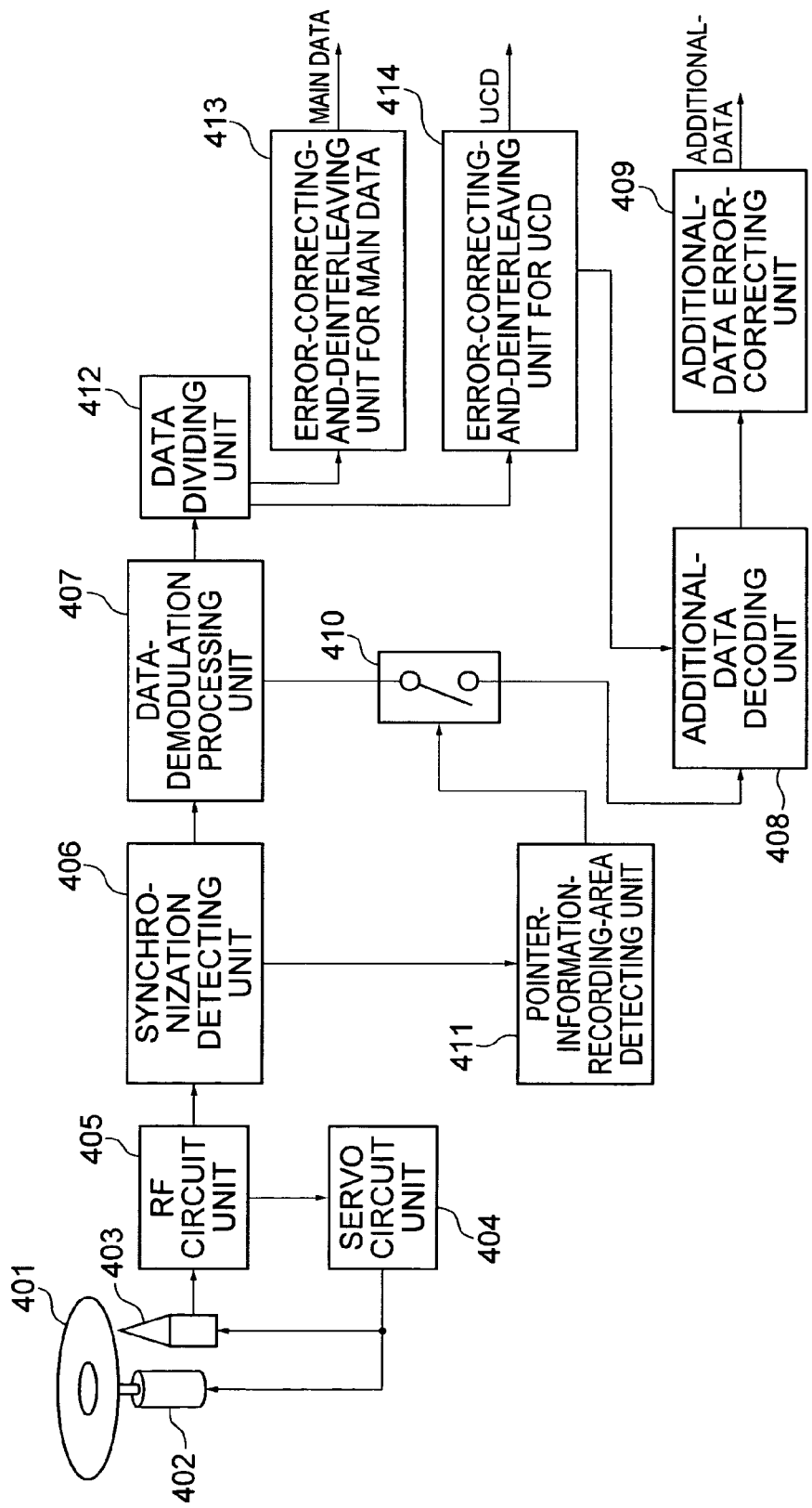
FIG. 15 is a block diagram showing an information playback processor of the present invention.

The configuration shown in FIG. 15 is a schematic block diagram illustrating the configuration and process of the information playback processor according to the embodiment of the present invention. For example, a process of acquiring a additional-data-storing-user-control-data pointer-information-set recording frame, and processes of acquiring and analyzing additional data can be executed such that a control unit, such as a CPU, executes a program describing the processes, etc. Therefore, in the information playback processor according to the embodiment of the present invention, items of hardware which correspond to the switch 410 shown in FIG. 15 and component elements in the other blocks shown in FIG. 15 are not essential. On hardware including a control unit for executing processing in accordance with a predetermined program, a CPU used as a data processing unit, and a memory used for storing data and parameters, processes of acquiring and playing back additional data are executable.

An application of the additional data acquired by the information playback processor is described below with reference to FIGS. 16A, 16B, and 17.

As described above, the additional data is, for example, encryption-key information for use as an encryption key for encrypted content, information forming part of the encryption-key information, encryption-key generating information such as the data (e.g., a seed) required for generating an encryption key, secret information such as a password, control information such as content playback control information or copy-control information, or other information such as content-attribute information.

FIG. 16A shows an example of processing in a case in which the additional data is encryption-key information for use as an encryption key for encrypted content, information forming part of the encryption-key information, or encryption-key generating information such as the data (e.g., a seed) required for generating an encryption key. The information playback processor uses the acquired encryption-key information to execute a main data decrypting process. This plays back content such as music and video. An encryption algorithm, such as DES or AES, is applied to the decrypting process.

FIG. 16B shows an example of a process in a case in which the additional data is content-playback control information corresponding to content recorded as the main data. In this case, control of playback of the main data (content) is executed in accordance with the content-playback control information acquired as the additional data. In the case of playing back the content, for example, control of a playback allowable range, such as output-form control such as 5.1-channel output control, and control of an introduction part of the content, are executed in accordance with the content-playback control information.

FIG. 17 shows an example of processing in a case in which the additional data is secret information such as a password, and content playback is allowed by checking the password. A password 511 is input as the additional data to a secret information checking unit 512. The secret information checking unit 512 compares the input password 511 with password information input from an external input device or the like. Only when both match each other does the secret information checking unit 512 set a switch 513 to be on. This allows the content as the main data, for example, data, such as music and video, to be played back.

Next, a playback process including reading of the additional data is described below with reference to FIG. 18. The process shown in FIG. 18 is executed by the information playback processor shown in FIG. 15.

In step S201, an RF signal is generated based on the information recording medium 401. In step S202, demodulating processing based on the RF signal is executed. As data in the process of demodulation, demodulated data of the additional-data-storing-user-control-data pointer-information-set recording frame is acquired.

The pointer-information-recording-area detecting unit 411 shown in FIG. 15 recognizes timing of demodulating the additional-data-storing-user-control-data pointer-information-set recording frame, whereby the frame is output from the data-demodulation processing unit 407 to the additional-data decoding unit 408.

In step S203, the additional-data decoding unit 408 determines which of a frame including a row pointer and a frame including a column pointer the frame input from the data-demodulation processing unit 407 is. When the frame is one including a row pointer, that is, when it is identified as an additional-data-storing-user-control-data row-pointer-information-set recording frame, in step S204, from DC control bits set in the additional-data-storing-user-control-data row-pointer-information-set recording frame, a row pointer for additional-data storing user control data is acquired.

When the input frame is identified as an additional-data-storing-user-control-data column-pointer-information-set recording frame, in step S205, from DC control bits set in the additional-data-storing-user-control-data column-pointer-information-set recording frame, a column pointer for additional-data storing user control data is acquired.

In step S206, it is determined whether acquisition of both pointer information has finished. If the acquisition has not finished yet, the process returns to step S202 and similar processing is repeatedly performed. If the acquisition of both pointer information has finished, the process proceeds to step S207, and acquires additional-data-storing user control data.

This is processing in which the additional-data decoding unit 408 shown in FIG. 1 acquires, from the error-correcting-and-deinterleaving unit 414, user control data corresponding to the acquired row and column numbers.

In step S208, the additional-data decoding unit 408 executes processing for reading additional data from the acquired additional-data-storing user control data.

In step S209, it is determined whether the end bit of the additional data has been acquired. If there is an unprocessed bit, step S202 and the subsequent steps are repeatedly executed. When the end bit of the additional data has been acquired, the process ends.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

Consecutive processing described in this specification can be executed one of hardware and software, or a configuration in which both are combined. When software processing is executed, it can be executed by installing a process-recorded program into a memory in a computer built-in dedicated hardware, or installing a program into a multi-purpose computer capable of executing various types of processing.

For example, the program can be recorded beforehand on a hard disk or on a read-only memory. Alternatively, the program can be temporarily or permanently stored (recorded) in a removable recording medium such as a CD-ROM (compact-disk read-only memory), an MO (magneto-optical disk), a DVD (digital versatile disk), a magnetic disk, or a semiconductor memory. The removable recording medium can be provided in the form of so-called "package software".

The program is installed from the above removable recording medium to a computer. Moreover, the program is wirelessly transferred from a download site to the computer or is transferred by wire to the computer through a network such as the Internet. The computer can receive and install the transferred program into a built-in recording medium such as a hard disk.

Various types of processing described in this specification are not only executed in a time-series manner in accordance with the description, but also may be executed in parallel or separately depending on the processing capability of an apparatus executing the processing or as required. In addition, in this specification, the system means a logical set of a plurality of apparatuses, and is not limited to one having different apparatuses in a single housing.

What is claimed is:

1. An information recording processor comprising:
   a DC-control-bit selecting unit for setting, as the values of DC control bits set in a user-control-data-pointer-information-set recording frame in which pointer information of user control data is set, the recording frame being selected from data to be recorded on an information recording medium, identification information of additional-data-storing user control data having component bits of additional data to be recorded on the information recording medium; and
   a modulated data generating unit for generating a modulated recording frame used as recording-unit data by executing processing for modulating data to be recorded and DC-control-bit setting processing, said modulated data generating unit selectively executing the DC-control-bit setting processing based on control of a digital sum variation and the DC-control-bit setting processing based on information input from said DC-control-bit selecting unit.

2. The information recording processor according to claim 1, wherein said DC-control-bit selecting unit is configured to execute processing in which row and column numbers corresponding to the additional-data-storing user control data are acquired as the identification information of additional-data-storing user control data, and pointer information representing at least one of the row and column numbers is selected as the values of DC control bits set in the user-control-data-pointer-information-set recording frame.

3. The information processor according to claim 1, wherein said modulated data generating unit is configured to execute processing in which:
   input information from said DC-control-bit selecting unit, the information corresponding to at least one of the row and column numbers corresponding to the additional-data-storing user control data, is received; and
   a user-control-data-pointer-information-set recording frame in which pieces of the input information are set at DC-control-bit setting positions is generated.

4. The information recording processor according to claim 1, wherein said modulated data generating unit is configured to execute processing in which at least one part of the DC control bits set in the user-control-data-pointer-information-set recording frame, the user-control-data-pointer-information-set recording frame being selected from the data to be recorded, is set based on DC-control-bit information input from said DC-control-bit selecting unit, and the other part of the DC control bits is set based on the control of the digital sum variation.

5. The information recording processor according to claim 1, wherein the additional data is set as component information included in at least one of content-encryption-key information for content to be recorded on the information recording medium, encryption-key generating information, content-playback control information, content-copy control information, and a password.

6. The information recording processor according to claim 1, wherein said modulated data generating unit is configured to generate the modulated recording frame by executing data converting processing satisfying (1, 7) run-length-limited encoding.

7. The information recording processor according to claim 1, wherein said modulated data generating unit is configured to execute modulated-recording-frame generating processing including conversion from two-bit information to three-bit information.

8. An information playback processor for executing processing for playing back information recorded on an information recording medium, said information playback processor comprising:
   a data demodulating unit for executing demodulating processing on data read from the information recording medium; and
   an additional data decoding unit for executing processing for performing extraction of a user-control-data-pointer-information-set frame in which pointer information of additional-data-storing user control data including additional data is set, acquisition of the pointer information of the additional-data-storing user control data on the basis of DC-control-bit information set in the extracted user-control-data-pointer-information-set frame, acquisition of the additional-data-storing user control data identified based on the pointer information, and acquisition of additional-data-component-bit information from the acquired user control data.

9. The information playback processor according to claim 8, wherein said additional data decoding unit is configured to execute processing for performing acquisition of the row and column numbers corresponding to the additional-data-storing user control data based on the DC-control-bit information set in the user-control-data-pointer-information-set frame, and acquisition of the additional-data-storing user control data identified based on the row and column numbers.

10. An information recording method comprising:
    a DC-control-bit selecting step of selecting, as the values of DC control bits set in a user-control-data-pointer-information-set recording frame in which pointer information of user control data is set, the recording frame being selected from data to be recorded on an information recording medium, identification information of additional-data-storing user control data having component bits of additional data to be recorded on the information recording medium; and
    a modulated data generating step in which a modulated recording frame used as recording-unit data is generated by executing processing for modulating data to be recorded and DC-control-bit setting processing, and in which the DC-control-bit setting processing based on control of a digital sum variation and the DC-control-bit setting processing based on selecting information in the DC-control-bit selecting step are selectively executed.

11. The information recording method according to claim 10, wherein, in the DC-control-bit selecting step, row and column numbers corresponding to the additional-data-storing user control data are acquired as the identification information of additional-data-storing user control data, and pointer information representing at-least one of the row and column numbers is selected as the values of DC control bits set in the user-control-data-pointer-information-set recording frame.

12. The information recording method according to claim 10, wherein, in the modulated data generating step, information selected in the DC-control-bit selecting step, the information corresponding to at least one of the row and column numbers corresponding to the additional-data-storing user control data, is received, and a user-control-data-pointer-information-set recording frame in which pieces of the input information are set at DC-control-bit setting positions is generated.

13. The information recording method according to claim 10, wherein, in the modulated data generating step, at least one part of the DC control bits set in the user-control-data-pointer-information-set recording frame, the user-control-data-pointer-information-set recording frame being selected from the data to be recorded, is set based on DC-control-bit information input in the DC-control-bit selecting step, and the other part of the DC control bits is set based on the control of the digital sum variation.

14. The information recording method according to claim 10, wherein the additional data is component information included in at least one of content-encryption-key information for content to be recorded on the information recording medium, encryption-key generating information, content-playback control information, content-copy control information, and a password.

15. The information recording method according to claim 10, wherein, in the modulated data generating step, the modulated recording frame is generated by executing data converting processing satisfying (1, 7) run-length-limited encoding.

16. The information recording method according to claim 10, wherein, in the modulated data generating step, modulated-recording-frame generating processing including conversion from two-bit information to three-bit information is executed.

17. An information playback method for executing processing for playing back information recorded on an information recording medium, said information playback method comprising:

a data demodulating step of executing demodulating processing on data read from the information recording medium; and an additional data decoding step of executing processing for performing extraction of a user-control-data-pointer-information-set frame in which pointer information of additional-data-storing user control data including additional data is set, acquisition of pointer information of the additional-data-storing user control data based on DC-control-bit information set in the extracted user-control-data-pointer-information-set frame, acquisition of the additional-data-storing user control data identified based on the pointer information, and acquisition of additional-data-component bit information from the acquired user control data.

18. The information playback method according to claim 17, wherein, in the additional data decoding step, the row and column numbers corresponding to the additional-data-storing user control data are acquired based on the DC-control-bit information set in the user-control-data-pointer-information-set frame, and based on the row and column numbers, the additional-data-storing user control data is identified and acquired.

19. A computer readable medium storing computer executable instructions, which when executed on a computer, execute information recording processing, the computer executable instructions comprising:

first computer executable instructions to control the computer to perform a DC-control-bit selecting operation of selecting, as the values of DC control bits set in a user-control-data-pointer-information-set recording frame in which pointer information of user control data is set, the recording frame being selected from data to be recorded on an information recording medium, identification information of additional-data-storing user control data having component bits of additional data to be recorded on the information recording medium; and second computer executable instructions to control the computer to perform a modulated data generating operation in which a modulated recording frame used as recording-unit data is generated by executing processing for modulating data to be recorded and DC-control-bit setting processing, and in which the DC-control-bit setting processing based on control of a digital sum variation and the DC-control-bit setting processing based on selecting information in the DC-control-bit selecting step are selectively executed.

20. A computer readable medium storing computer executable instructions, which when executed on a computer, execute processing for playing back information recorded on an information recording medium, the computer executable instructions comprising:

first computer executable instructions to control the computer to perform a data demodulating operation of executing demodulating processing on data read from the information recording medium; and second computer executable instructions to control the computer to perform an additional data decoding operation of executing processing for performing extraction of a user-control-data-pointer-information-set frame in which pointer information of user control data including additional data is set, acquisition of the pointer information of the additional-data-storing user control data on the basis of DC-control-bit information set in the extracted user-control-data-pointer-information-set frame, acquisition of the additional-data-storing user control data identified based on the pointer information, and acquisition of additional data component bits from the acquired user control data.

* * * * *